(12) United States Patent
Zhang et al.

(10) Patent No.: US 9,628,253 B2
(45) Date of Patent: Apr. 18, 2017

(54) METHOD AND SYSTEM FOR IMPLEMENTING TIME DIVISION DUPLEX CONFIGURATION OF SECONDARY SERVING CELL, AND BASE STATION

(71) Applicant: Huawei Technologies Co., Ltd., Shenzhen, Guangdong (CN)

(72) Inventors: Tao Zhang, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 14/599,755

(22) Filed: Jan. 19, 2015

(65) Prior Publication Data
US 2015/0131495 A1    May 14, 2015

Related U.S. Application Data

(63) Continuation of application No. PCT/CN2012/078984, filed on Jul. 20, 2012.

(51) Int. Cl.
*H04J 3/00* (2006.01)
*H04L 5/14* (2006.01)
*H04W 72/04* (2009.01)

(52) U.S. Cl.
CPC ........... *H04L 5/14* (2013.01); *H04W 72/0406* (2013.01); *H04W 72/0446* (2013.01); *H04W 72/042* (2013.01); *H04W 72/0426* (2013.01)

(58) Field of Classification Search
CPC ............... H04W 5/14; H04W 72/0406; H04W 72/0446; H04W 72/042; H04W 72/0426; H04L 5/14
See application file for complete search history.

(56) References Cited

U.S. PATENT DOCUMENTS

2002/0119778 A1    8/2002  Baker et al.
2009/0185632 A1*   7/2009  Cai ........................ H04L 5/0044
                                                          375/260
(Continued)

FOREIGN PATENT DOCUMENTS

CN        1457618 A      11/2003
CN      102083153 A       6/2011
(Continued)

OTHER PUBLICATIONS

"Discussion on Methods to support different time scales for TDD UL-DL reconfiguration", Nokia Corporation, 3GPP TSG-RAN WG1 Meeting #69, May 21-25, 2012, 4 pages.
(Continued)

*Primary Examiner* — Abdelnabi O Musa

(57) ABSTRACT

A method and a system for implementing time division duplex configuration of a secondary serving cell are provided. A primary base station receives time division duplex TDD configuration information of a secondary serving cell and an identity of the secondary serving cell from a secondary base station, where the TDD configuration information of the secondary serving cell is allocated by the secondary base station to the secondary serving cell. The primary base station sends the TDD configuration information of the secondary serving cell and the identity of the secondary serving cell to a terminal, so that the terminal determines an uplink-downlink subframe allocation of the secondary serving cell according to the TDD configuration information.

12 Claims, 10 Drawing Sheets

(56) References Cited

U.S. PATENT DOCUMENTS

| | | | |
|---|---|---|---|
| 2012/0120920 A1 | 5/2012 | Zhang et al. | |
| 2013/0194981 A1* | 8/2013 | Wang | H04L 1/1671 370/280 |
| 2013/0208634 A1* | 8/2013 | Ji | H04W 72/0406 370/280 |
| 2013/0250882 A1* | 9/2013 | Dinan | H04W 72/0426 370/329 |
| 2013/0322235 A1* | 12/2013 | Khoryaev | H04W 24/10 370/229 |
| 2014/0010128 A1* | 1/2014 | He | H04W 4/06 370/280 |
| 2014/0192687 A1* | 7/2014 | Kim | H04L 5/001 370/280 |

FOREIGN PATENT DOCUMENTS

| | | |
|---|---|---|
| CN | 102325005 A | 1/2012 |
| JP | 2014527765 A | 10/2014 |
| KR | 20120069727 A | 6/2012 |
| WO | WO 2008/155764 A2 | 12/2008 |
| WO | WO 2010/143924 A2 | 12/2010 |
| WO | WO 2011/034966 A1 | 3/2011 |
| WO | WO 2013/024335 A2 | 2/2013 |

OTHER PUBLICATIONS

"Methods to support different time scales for TDD UL-DL reconfiguration", Alcatel-Lucent Shanghai Bell, 3GPP TSG RAN WG1 Meeting #69, May 21-25, 2012, 2 pages.

"Different TDD configurations in inter-band CA", Ericsson, 3GPP TSG-RAN WG2 #77bis, 4 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 v11.0.0, Jun. 2012, 302 pages.

"Operation Principles of CC specific TDD Configuration", Renesas Mobile Europe, 3GPP TSG-RAN WG2 Meeting #74, May 9-13, 2011, 3 pages, R2-112938.

\* cited by examiner

METHOD AND SYSTEM FOR IMPLEMENTING TIME DIVISION DUPLEX CONFIGURATION OF SECONDARY SERVING CELL, AND BASE STATION

CROSS-REFERENCE TO RELATED APPLICATIONS

This application is a continuation of International Application No. PCT/CN2012/078984, filed on Jul. 20, 2012, which is hereby incorporated by reference in its entirety.

TECHNICAL FIELD

The present invention relates to the communications field, and in particular, to a method and a system for implementing time division duplex configuration of a secondary serving cell, and a base station.

BACKGROUND

Currently, in network deployment of a wireless communications network, one base station has two different cells, and a terminal may maintain connection to the two different cells of the base station simultaneously. Of two cells that maintain connection to a same terminal, one is a primary serving cell, and the other is a secondary serving cell. In a communication process between the primary serving cell and the terminal, an FDD (frequency division duplex) manner may be adopted, and a TDD (time division duplex) manner may also be adopted; in a communication process between the secondary serving cell and the terminal, the TDD manner is adopted.

In the prior art, when a base station performs TDD configuration on a secondary serving cell, the base station determines TDD configuration information for the secondary serving cell, and sends, by using a primary serving cell, a TDD configuration information of the secondary serving cell to a terminal; and after receiving the TDD configuration message of the secondary serving cell, the terminal determines an uplink-downlink subframe allocation of the secondary serving cell, that is, the terminal determines a subframe number used when a signal is sent to the base station and a subframe number used when a signal sent by the base station is received, so that the terminal and the secondary serving cell communicate with each other according to the uplink-downlink subframe allocation of the secondary serving cell.

However, in new network deployment, it is possible that a primary serving cell and a secondary serving cell of a terminal belong to different base stations, where a base station to which the primary serving cell belongs is a primary base station, a base station to which the secondary serving cell belongs is a secondary base station. When a primary serving cell and a secondary serving cell of a terminal belong to different base stations, TDD configuration of the secondary serving cell cannot be completed by using a method in the prior art.

SUMMARY

The present invention provides a method and a system for implementing time division duplex configuration of a secondary serving cell, and a base station, which can complete, when a primary serving cell and a secondary serving cell of a terminal belong to different base stations, TDD configuration of the secondary serving cell.

To achieve the foregoing objective, the following technical solutions are used in embodiments of the present invention.

A first aspect provides a method for implementing time division duplex configuration of a secondary serving cell, including:

receiving, by a primary base station, time division duplex TDD configuration information of the secondary serving cell and an identity of the secondary serving cell that are sent by a secondary base station, where the TDD configuration information of the secondary serving cell is allocated by the secondary base station to the secondary serving cell; and sending, by the primary base station, the TDD configuration information of the secondary serving cell and the identity of the secondary serving cell to a terminal, so that the terminal determines an uplink-downlink subframe allocation of the secondary serving cell according to the TDD configuration information.

In a possible implementation manner, the receiving, by a primary base station, time division duplex TDD configuration information of the secondary serving cell and an identity of the secondary serving cell that are sent by a secondary base station includes:

receiving, by the primary base station, a first message sent by the secondary base station, where the first message includes a first time point, the TDD configuration information of the secondary serving cell of the secondary base station, and the identity of the secondary serving cell, and the first time point is used to indicate a time at which the primary base station sends a second message to the terminal; and the sending, by the primary base station, the TDD configuration information of the secondary serving cell and the identity of the secondary serving cell to a terminal includes:

sending, by the primary base station, the second message to the terminal when the first time point arrives, where the second message includes the TDD configuration information of the secondary serving cell and the identity of the secondary serving cell.

In a possible implementation manner, the receiving, by a primary base station, time division duplex TDD configuration information of the secondary serving cell and an identity of the secondary serving cell that are sent by a secondary base station includes:

receiving, by the primary base station, a first message sent by the secondary base station, where the first message includes a second time point, the TDD configuration information of the secondary serving cell of the secondary base station, and the identity of the secondary serving cell, and the second time point is a time at which the TDD configuration information of the secondary serving cell takes effect separately on the secondary base station and the terminal; and the sending, by the primary base station, the TDD configuration information of the secondary serving cell and the identity of the secondary serving cell to a terminal includes:

sending, by the primary base station, the first message to the terminal before the second time point arrives.

In a possible implementation manner, before the sending, by the primary base station, the TDD configuration information of the secondary serving cell and the identity of the secondary serving cell to a terminal, the method further includes:

after receiving, by the primary base station, the TDD configuration information of the secondary serving cell and the identity of the secondary serving cell, determining a third time point, where:

the third time point is a time point obtained by adding prestored first duration to a time point at which the primary base station receives the TDD configuration information of the secondary serving cell and the identity of the secondary serving cell, the third time point is a time at which the TDD configuration information of the secondary serving cell takes effect on the terminal, and the first duration is a time interval between a time point at which the secondary base station sends the TDD configuration information of the secondary serving cell and the identity of the secondary serving cell and a default time point at which the TDD configuration information of the secondary serving cell takes effect on the secondary base station; and the sending, by the primary base station, the TDD configuration information of the secondary serving cell and the identity of the secondary serving cell to a terminal includes:

sending, by the primary base station, a second message to the terminal before the third time point arrives, where the second message includes the third time point, the TDD configuration information of the secondary serving cell, and the identity of the secondary serving cell.

A method for implementing time division duplex configuration of a secondary serving cell is further provided in the present invention, including:

determining, by a secondary base station, time division duplex TDD configuration information for the secondary serving cell of the secondary base station; and sending, by the secondary base station, the TDD configuration information of the secondary serving cell and an identity of the secondary serving cell to a primary base station, so that the primary base station sends the TDD configuration information of the secondary serving cell and the identity of the secondary serving cell to a terminal, and therefore the terminal determines an uplink-downlink subframe allocation of the secondary serving cell according to the TDD configuration information of the secondary serving cell.

In a possible implementation manner, the sending, by the secondary base station, the TDD configuration information of the secondary serving cell and an identity of the secondary serving cell to a primary base station, so that the primary base station sends the TDD configuration information of the secondary serving cell and the identity of the secondary serving cell to a terminal includes:

sending, by the secondary base station, a first message to the primary base station, where the first message includes a first time point, the TDD configuration information of the secondary serving cell, and the identity of the secondary serving cell, and the first time point is used to indicate a time at which the primary base station sends a second message to the terminal, so that when the first time point arrives, the primary base station sends the second message to the terminal, where the second message includes the TDD configuration information of the secondary serving cell and the identity of the secondary serving cell.

In a possible implementation manner, the sending, by the secondary base station, the TDD configuration information of the secondary serving cell and an identity of the secondary serving cell to a primary base station, so that the primary base station sends the TDD configuration information of the secondary serving cell and the identity of the secondary serving cell to a terminal includes:

sending, by the secondary base station, a first message to the primary base station, where the first message includes a second time point, the TDD configuration information of the secondary serving cell, and the identity of the secondary serving cell, and the second time point is a time at which the TDD configuration information of the secondary serving cell takes effect separately on the secondary base station and the terminal, so that the primary base station sends the first message to the terminal.

A method for implementing time division duplex configuration of a secondary serving cell is further provided in the present invention, including:

determining, by a primary base station, time division duplex TDD configuration information for the secondary serving cell of a secondary base station; and sending, by the primary base station, the TDD configuration information of the secondary serving cell and an identity of the secondary serving cell to the secondary base station, and sending the TDD configuration information of the secondary serving cell and the identity of the secondary serving cell to a terminal, so that the secondary base station and the terminal determine an uplink-downlink subframe allocation of the secondary serving cell according to the TDD configuration information of the secondary serving cell.

In a possible implementation manner, the sending, by the primary base station, the TDD configuration information of the secondary serving cell and an identity of the secondary serving cell to the secondary base station includes:

sending, by the primary base station, a first message to the secondary base station, where the first message includes a first time point, the TDD configuration information of the secondary serving cell, and the identity of the secondary serving cell, and the first time point is a time at which the TDD configuration information of the secondary serving cell takes effect on the secondary base station;

before the sending, by the primary base station, the TDD configuration information of the secondary serving cell and the identity of the secondary serving cell to a terminal, the method further includes:

determining, by the primary base station, a first sending time point, where:

the first sending time point is a time point obtained by subtracting prestored first duration from the first time point, and the first duration is a time interval between a time point at which the terminal receives a second message and a default time point at which the TDD configuration information of the secondary serving cell takes effect on the terminal; and the sending, by the primary base station, the TDD configuration information of the secondary serving cell and the identity of the secondary serving cell to a terminal includes:

sending, by the primary base station, the second message to the terminal when the first sending time point arrives, where the second message includes the TDD configuration information of the secondary serving cell and the identity of the secondary serving cell.

In a possible implementation manner, the sending, by the primary base station, the TDD configuration information of the secondary serving cell and an identity of the secondary serving cell to the secondary base station includes:

sending, by the primary base station, a first message to the secondary base station, where the first message includes a second time point, the TDD configuration information of the secondary serving cell, and the identity of the secondary serving cell, and the second time point is a time at which the TDD configuration information of the secondary serving cell takes effect separately on the secondary base station and the terminal; and the sending, by the primary base station, the TDD configuration information of the secondary serving cell and the identity of the secondary serving cell to a terminal includes:

sending, by the primary base station, the first message to the terminal.

In a possible implementation manner, the sending, by the primary base station, the TDD configuration information of the secondary serving cell and the identity of the secondary serving cell to a terminal includes:

sending, by the primary base station, a first message to the terminal, where the first message includes a third time point, the TDD configuration information of the secondary serving cell, and the identity of the secondary serving cell, and the third time point is a time at which the TDD configuration information of the secondary serving cell takes effect separately on the secondary base station and the terminal;

before the sending, by the primary base station, the TDD configuration information of the secondary serving cell and an identity of the secondary serving cell to the secondary base station, the method further includes:

determining, by the primary base station, a second sending time point, where:

the second sending time point is a time point obtained by subtracting prestored second duration from the third time point, and the second duration is a time interval between a time point at which the secondary base station receives a second message and a default time point at which the TDD configuration information of the secondary serving cell takes effect on the secondary base station; and the sending, by the primary base station, the TDD configuration information of the secondary serving cell and an identity of the secondary serving cell to the secondary base station includes:

sending, by the primary base station, the second message to the secondary base station when the second sending time point arrives, where the second message includes the TDD configuration information of the secondary serving cell and the identity of the secondary serving cell.

In a possible implementation manner, before the determining, by a primary base station, time division duplex TDD configuration information for the secondary serving cell of a secondary base station, the method further includes:

receiving, by the primary base station, a request message sent by the secondary base station, where the request message includes the volume of data in a downlink buffer of the secondary serving cell and the volume of data in an uplink buffer of the terminal; and the determining, by a primary base station, time division duplex TDD configuration information for the secondary serving cell of a secondary base station includes:

determining, by the primary base station, the TDD configuration information for the secondary serving cell of the secondary base station according to the volume of data in the downlink buffer of the secondary serving cell and the volume of data in the uplink buffer of the terminal.

Another method for implementing time division duplex configuration of a secondary serving cell is provided in the present invention, including:

receiving, by a secondary base station, time division duplex TDD configuration information of the secondary serving cell of the secondary base station and an identity of the secondary serving cell that are sent by a primary base station, so that the secondary base station determines an uplink-downlink subframe allocation of the secondary serving cell according to the TDD configuration information of the secondary serving cell.

In a possible implementation manner, the receiving, by a secondary base station, time division duplex TDD configuration information of the secondary serving cell of the secondary base station and an identity of the secondary serving cell that are sent by a primary base station includes:

receiving, by the secondary base station, a first message sent by the primary base station, where the first message includes a first time point, the TDD configuration information of the secondary serving cell of the secondary base station, and the identity of the secondary serving cell, and the first time point is a time at which the TDD configuration information of the secondary serving cell takes effect on the secondary base station.

In a possible implementation manner, before the receiving, by a secondary base station, TDD configuration information of the secondary serving cell of the secondary base station and an identity of the secondary serving cell that are sent by a primary base station, the method further includes:

receiving, by the secondary base station, buffer status report information of a terminal that is sent by the terminal;

determining, by the secondary base station, the volume of data in an uplink buffer of the terminal according to the buffer status report information; and sending, by the secondary base station, a request message to the primary base station, where the request message includes the volume of data in a downlink buffer of the secondary serving cell and the volume of data in the uplink buffer of the terminal.

According to a second aspect, a primary base station is provided, including:

a receiving unit, configured to: receive time division duplex TDD configuration information of a secondary serving cell and an identity of the secondary serving cell that are sent by a secondary base station, where the TDD configuration information of the secondary serving cell is allocated by the secondary base station to the secondary serving cell; and send the TDD configuration information of the secondary serving cell and the identity of the secondary serving cell to a sending unit; and the sending unit, configured to: receive the TDD configuration information of the secondary serving cell and the identity of the secondary serving cell that are sent by the receiving unit, and send the TDD configuration information of the secondary serving cell and the identity of the secondary serving cell to a terminal, so that the terminal determines an uplink-downlink subframe allocation of the secondary serving cell according to the TDD configuration information.

In a possible implementation manner, the receiving unit is specifically configured to: receive a first message sent by the secondary base station, where the first message includes a first time point, the TDD configuration information of the secondary serving cell of the secondary base station, and the identity of the secondary serving cell, and the first time point is used to indicate a time at which the primary base station sends a second message to the terminal; and send the first message to the sending unit; and the sending unit is specifically configured to: receive the first message sent by the receiving unit, and when the first time point arrives, send the second message to the terminal, where the second message includes the TDD configuration information of the secondary serving cell and the identity of the secondary serving cell.

In a possible implementation manner, the receiving unit is specifically configured to: receive a first message sent by the secondary base station, where the first message includes a second time point, the TDD configuration information of the secondary serving cell of the secondary base station, and the identity of the secondary serving cell, and the second time point is a time at which the TDD configuration information of the secondary serving cell takes effect separately on the secondary base station and the terminal; and send the first message to the sending unit; and the sending unit is specifically configured to: receive the first message sent by the receiving unit, and before the second time point arrives, send the first message to the terminal.

In a possible implementation manner, the primary base station further includes:

a determining unit, configured to: after the receiving unit receives the TDD configuration information of the secondary serving cell and the identity of the secondary serving cell, determine a third time point, and send the third time point to the sending unit, where:

the third time point is a time point obtained by adding prestored first duration to a time point at which the receiving unit receives the TDD configuration information of the secondary serving cell and the identity of the secondary serving cell, the third time point is a time at which the TDD configuration information of the secondary serving cell takes effect on the terminal, and the first duration is a time interval between a time point at which the secondary base station sends the TDD configuration information of the secondary serving cell and the identity of the secondary serving cell and a default time point at which the TDD configuration information of the secondary serving cell takes effect on the secondary base station; and the sending unit is specifically configured to: receive the third time point sent by the determining unit, and before the third time point arrives, send a second message to the terminal, where the second message includes the third time point, the TDD configuration information of the secondary serving cell, and the identity of the secondary serving cell.

A secondary base station is further provided in the present invention, including:

an allocating unit, configured to: determine time division duplex TDD configuration information for a secondary serving cell of the secondary base station, and send the TDD configuration information of the secondary serving cell to a sending unit; and the sending unit, configured to: receive the TDD configuration information of the secondary serving cell that is sent by the allocating unit, and send the TDD configuration information of the secondary serving cell and an identity of the secondary serving cell to a primary base station, so that the primary base station sends the TDD configuration information of the secondary serving cell and the identity of the secondary serving cell to a terminal, and therefore the terminal determines an uplink-downlink subframe allocation of the secondary serving cell according to the TDD configuration information of the secondary serving cell.

In a possible implementation manner, the sending unit is specifically configured to: receive the TDD configuration information of the secondary serving cell that is sent by the allocating unit, and send a first message to the primary base station, where the first message includes a first time point, the TDD configuration information of the secondary serving cell, and the identity of the secondary serving cell, and the first time point is used to indicate a time at which the primary base station sends a second message to the terminal, so that when the first time point arrives, the primary base station sends the second message to the terminal, where the second message includes the TDD configuration information of the secondary serving cell and the identity of the secondary serving cell.

In a possible implementation manner, the sending unit is specifically configured to: receive the TDD configuration information of the secondary serving cell that is sent by the allocating unit, and send a first message to the primary base station, where the first message includes a second time point, the TDD configuration information of the secondary serving cell, and the identity of the secondary serving cell, and the second time point is a time at which the TDD configuration information of the secondary serving cell takes effect separately on the secondary base station and the terminal, so that the primary base station sends the first message to the terminal.

Another primary base station is further provided in the present invention, including:

an allocating unit, configured to: determine time division duplex TDD configuration information for a secondary serving cell of a secondary base station, and send the TDD configuration information of the secondary serving cell to a sending unit; and the sending unit, configured to: receive the TDD configuration information of the secondary serving cell that is sent by the allocating unit, send the TDD configuration information of the secondary serving cell and an identity of the secondary serving cell to the secondary base station, and send the TDD configuration information of the secondary serving cell and the identity of the secondary serving cell to a terminal, so that the secondary base station and the terminal determine an uplink-downlink subframe allocation of the secondary serving cell according to the TDD configuration information of the secondary serving cell.

In a possible implementation manner, the sending unit is specifically configured to send a first message to the secondary base station, where the first message includes a first time point, the TDD configuration information of the secondary serving cell, and the identity of the secondary serving cell, and the first time point is a time at which the TDD configuration information of the secondary serving cell takes effect on the secondary base station; and the primary base station further includes:

a first determining unit, configured to: determine a first sending time point, and send the first time point to the sending unit, where:

the first sending time point is a time point obtained by subtracting prestored first duration from the first time point, and the first duration is a time interval between a time point at which the terminal receives a second message and a default time point at which the TDD configuration information of the secondary serving cell takes effect on the terminal, where:

the sending unit is further specifically configured to: receive the first time point sent by the first determining unit, and when the first sending time point arrives, send the second message to the terminal, where the second message includes the TDD configuration information of the secondary serving cell and the identity of the secondary serving cell.

In a possible implementation manner, the sending unit is specifically configured to: send a first message to the secondary base station, where the first message includes a second time point, the TDD configuration information of the secondary serving cell, and the identity of the secondary serving cell, and the second time point is a time at which the TDD configuration information of the secondary serving cell takes effect separately on the secondary base station and the terminal; and send the first message to the terminal.

In a possible implementation manner, the sending unit is specifically configured to send a first message to the terminal, where the first message includes a third time point, the TDD configuration information of the secondary serving cell, and the identity of the secondary serving cell, and the third time point is a time at which the TDD configuration information of the secondary serving cell takes effect separately on the secondary base station and the terminal; and the primary base station further includes:

a second determining unit, configured to: determine a second sending time point, and send the second sending time point to the sending unit, where:

the second sending time point is a time point obtained by subtracting prestored second duration from the third time point, and the second duration is a time interval between a time point at which the secondary base station receives a second message and a default time point at which the TDD configuration information of the secondary serving cell takes effect on the secondary base station, where:

the sending unit is further specifically configured to: receive the second sending time point sent by the second determining unit, and when the second sending time point arrives, send the second message to the secondary base station, where the second message includes the TDD configuration information of the secondary serving cell and the identity of the secondary serving cell.

In a possible implementation manner, the primary base station further includes:

a receiving unit, configured to: receive a request message sent by the secondary base station, where the request message includes the volume of data in a downlink buffer of the secondary serving cell and the volume of data in an uplink buffer of the terminal; and send the request message to the allocating unit, where:

the allocating unit is specifically configured to: receive the request message sent by the receiving unit, and determine, according to the volume of data in the downlink buffer of the secondary serving cell and the volume of data in the uplink buffer of the terminal, the TDD configuration information for the secondary serving cell of the secondary base station.

Another secondary base station is further provided in the present invention, including:

a receiving unit, configured to receive time division duplex TDD configuration information of a secondary serving cell of the secondary base station and an identity of the secondary serving cell that are sent by a primary base station, so that the secondary base station determines an uplink-downlink subframe allocation of the secondary serving cell according to the TDD configuration information of the secondary serving cell.

In a possible implementation manner, the receiving unit is specifically configured to receive a first message sent by the primary base station, where the first message includes a first time point, the TDD configuration information of the secondary serving cell of the secondary base station, and the identity of the secondary serving cell, and the first time point is a time at which the TDD configuration information of the secondary serving cell takes effect on the secondary base station.

In a possible implementation manner, the receiving unit is further configured to: receive buffer status report information of a terminal that is sent by the terminal, and send the buffer status report information to a determining unit; and the secondary base station further includes:

the determining unit, configured to: receive the buffer status report information sent by the receiving unit, determine the volume of data in an uplink buffer of the terminal according to the buffer status report information, and send the volume of data in the uplink buffer of the terminal to a sending unit; and the sending unit, configured to: receive the volume of data, sent by the determining unit, in the uplink buffer of the terminal, and send a request message to the primary base station, where the request message includes the volume of data in a downlink buffer of the secondary serving cell and the volume of data in the uplink buffer of the terminal.

According to a third aspect, a system for implementing time division duplex configuration of a secondary serving cell is provided in the present invention, including the foregoing terminal, the foregoing primary base station, and the foregoing secondary base station.

According to a method and a system for implementing time division duplex configuration of a secondary serving cell, and a base station that are provided in the present invention, when TDD configuration is performed on a secondary serving cell, a secondary base station can proactively determine TDD configuration information for the secondary serving cell, which requires TDD configuration, of the secondary base station, and send the TDD configuration information of the secondary serving cell and an identity of the secondary serving cell to a primary base station; therefore, the primary base station receives the TDD configuration information of the secondary serving cell and the identity of the secondary serving cell that are sent by the secondary base station, and can send the TDD configuration information of the secondary serving cell and the identity of the secondary serving cell to a terminal, so that the terminal determines uplink-downlink subframe allocation of the secondary serving cell according to the TDD configuration information of the secondary serving cell. Alternatively, a primary base station proactively determines TDD configuration information for a secondary serving cell which requires TDD configuration, and separately sends the TDD configuration information of the secondary serving cell and an identity of the secondary serving cell to a secondary base station and a terminal, so that the secondary base station and the terminal can determine an uplink-downlink subframe allocation of the secondary serving cell according to the TDD configuration information of the secondary serving cell. In the present invention, after both the secondary base station and the terminal acquire the TDD configuration information of the secondary serving cell, and determine the uplink-downlink subframe allocation of the secondary serving cell according to the TDD configuration information of the secondary serving cell, TDD configuration of the secondary serving cell is completed. It can be learned that according to the present invention, when a primary serving cell and a secondary serving cell of a terminal belong to different base stations, TDD configuration of the secondary serving cell can be completed.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

It should be noted that, in the following embodiments of the present invention, a delay between a primary base station and a secondary base station and a delay between the primary base station and a terminal are ignored, so as to ensure that the TDD configuration information of a secondary serving cell takes effect on the secondary base station and on the terminal simultaneously.

Embodiment 1

Figure 1:
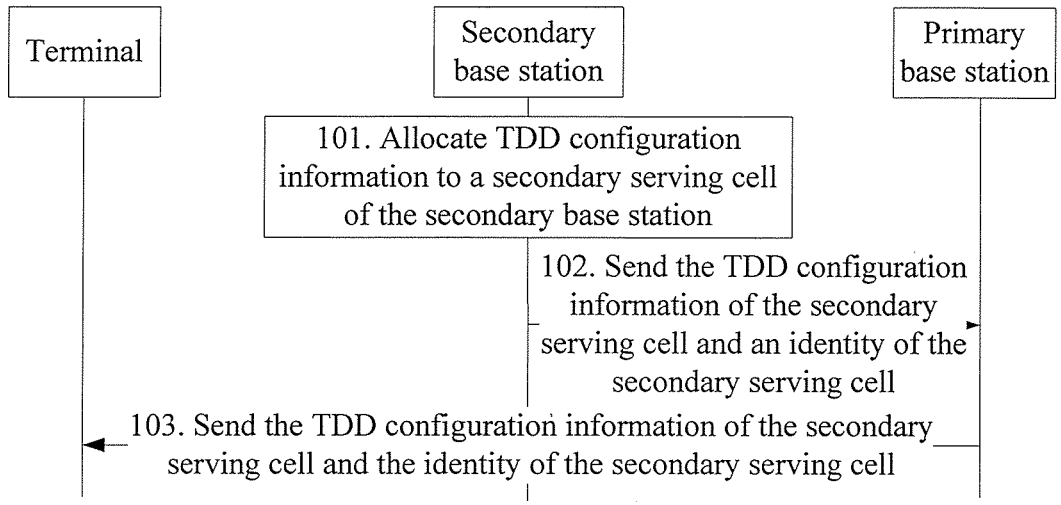
FIG. 1 is a flowchart of a method for implementing time division duplex configuration of a secondary serving cell according to Embodiment 1 of the present invention.

Referring to FIG. 1, FIG. 1 is a flowchart of a method for implementing time division duplex configuration of a secondary serving cell according to this embodiment, and the method specifically includes:

101. A secondary base station determines TDD configuration information for a secondary serving cell of the secondary base station.

A method for determining TDD configuration information for a secondary serving cell of a secondary base station by the secondary base station is the same as a method for determining TDD configuration information for a secondary serving cell by a base station in the prior art, and details are not described herein again.

102. The secondary base station sends the TDD configuration information of the secondary serving cell and an identity of the secondary serving cell to a primary base station.

Optionally, a first implementation manner in this embodiment is as follows:

Before the secondary base station communicates with a terminal, a person skilled in the art sets, for the secondary base station, first duration between a time point at which the TDD configuration information of the secondary serving cell is sent and a default time point at which the TDD configuration information of the secondary serving cell takes effect on the secondary base station; sets, for the terminal, second duration between a time point at which the TDD configuration information of the secondary serving cell is received and a default time point at which the TDD configuration information of the secondary serving cell takes effect on the terminal, and separately saves the first duration and the second duration on the primary base station.

It should be noted that, after the secondary base station sends the TDD configuration information of the secondary serving cell and the identity of the secondary serving cell to the primary base station, and the first duration passes, the secondary base station starts to communicate with the terminal according to the TDD configuration information of the secondary serving cell.

For example, the first duration is 200 subframes, and after the secondary base station sends the TDD configuration information of the secondary serving cell and the identity of the secondary serving cell to the primary base station, and 200 subframes pass, the secondary base station starts to communicate with the terminal according to the TDD configuration information of the secondary serving cell.

Optionally, a second implementation manner in this embodiment is as follows:

After the secondary base station sends the TDD configuration information of the secondary serving cell and the identity of the secondary serving cell to the primary base station, the TDD configuration information of the secondary serving cell starts to take effect on the secondary base station. In this case, the secondary base station receives, in an uplink subframe and according to the TDD configuration information of the secondary serving cell, data sent by the terminal; after receiving, in the uplink subframe, the data sent by the terminal, the secondary base station learns that the TDD configuration information of the secondary serving cell has taken effect by default on the terminal; and afterwards, the secondary base station communicates with the terminal according to the TDD configuration information of the secondary serving cell.

It should be noted that specific implementation of step 102 in this embodiment is not limited to the foregoing two manners.

103. After receiving the TDD configuration information of the secondary serving cell and the identity of the secondary serving cell that are sent by the secondary base station, the primary base station sends the TDD configuration information of the secondary serving cell and the identity of the secondary serving cell to a terminal, so that the terminal determines an uplink-downlink subframe allocation of the secondary serving cell according to the TDD configuration information.

Optionally, for the first implementation manner of the foregoing step 102, this step may be specifically implemented by using the following method:

After the terminal receives the TDD configuration information of the secondary serving cell and the identity of the secondary serving cell, and the second duration passes, the terminal starts to communicate with the secondary base station according to the TDD configuration information of the secondary serving cell. A period of time is required from that the primary base station receives the TDD configuration information of the secondary serving cell and the identity of the secondary serving cell to that the primary base station sends the TDD configuration information of the secondary serving cell and the identity of the secondary serving cell to the terminal; therefore, the set first duration is greater than the second duration.

For example, the second duration is 180 subframes, and after the terminal receives the TDD configuration information of the secondary serving cell and the identity of the secondary serving cell, and 180 subframes pass, the terminal starts to communicate with the secondary base station according to the TDD configuration information of the secondary serving cell.

It should also be noted that, to ensure that the TDD configuration information of the secondary serving cell takes effect on the secondary base station and the terminal at the same time, when the first duration is 200 subframes, the second duration is 180 subframes, and the primary base station receives, at the tenth subframe, the TDD configuration information of the secondary serving cell and the identity of the secondary serving cell that are sent by the secondary base station, in this case, the primary base station sends the TDD configuration information of the secondary serving cell and the identity of the secondary serving cell to the terminal at the $30^{th}$ subframe.

Optionally, for the second implementation manner of the foregoing step 102, this step may be specifically implemented by using the following method:

After receiving the TDD configuration information of the secondary serving cell and the identity of the secondary serving cell, the terminal sends the data to the secondary base station in the uplink subframe according to the TDD configuration information of the secondary serving cell; and after receiving data sent by the secondary base station in a downlink subframe, the terminal starts to communicate with the secondary base station according to the TDD configuration information of the secondary serving cell.

It should be noted that specific implementation of step 103 in this embodiment is not limited to the foregoing two manners.

According to the method for implementing time division duplex configuration of a secondary serving cell described in the foregoing FIG. 1, when TDD configuration is performed on a secondary serving cell, a secondary base station can proactively determine TDD configuration information for a secondary serving cell, which requires TDD configuration, of the secondary base station, and send the TDD configuration information of the secondary serving cell and an identity of the secondary serving cell to a primary base station; therefore, the primary base station receives the TDD configuration information of the secondary serving cell and the identity of the secondary serving cell that are sent by the secondary base station, and can send the TDD configuration information of the secondary serving cell and the identity of the secondary serving cell to a terminal, so that the terminal determines an uplink-downlink subframe allocation of the secondary serving cell according to the TDD configuration information of the secondary serving cell. In this embodiment, after the terminal receives the TDD configuration information of the secondary serving cell and the identity of the secondary serving cell that are sent by the primary base station, and determines the uplink-downlink subframe allocation of the secondary serving cell according to the TDD configuration information of the secondary serving cell, TDD configuration of the secondary serving cell is completed. It can be learned that according to the method, when a primary serving cell and a secondary serving cell of a terminal belong to different base stations, TDD configuration of the secondary serving cell can be completed.

Figure 2:
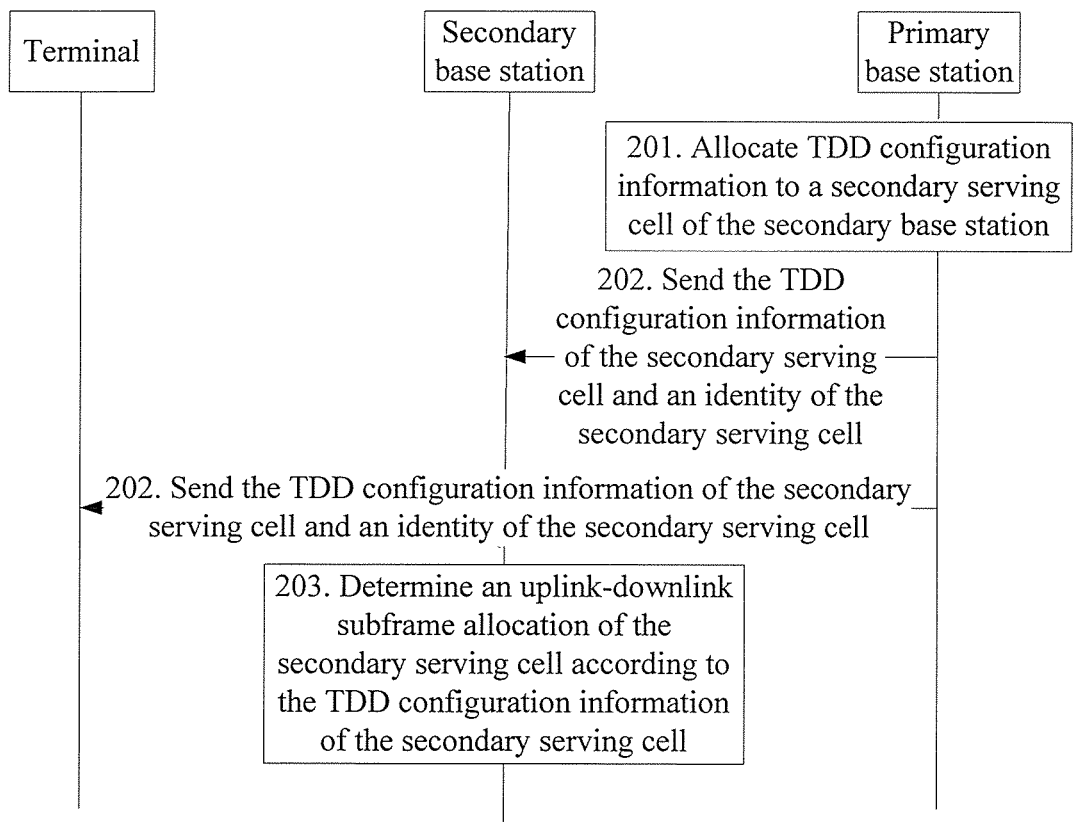
FIG. 2 is a flowchart of another method for implementing time division duplex configuration of a secondary serving cell according to Embodiment 1 of the present invention.

Referring to FIG. 2, FIG. 2 is a flowchart of another method for implementing time division duplex configuration of a secondary serving cell according to this embodiment, and the method specifically includes:

201. A primary base station determines TDD configuration information for a secondary serving cell of a secondary base station.

202. The primary base station sends the TDD configuration information of the secondary serving cell and an identity of the secondary serving cell to the secondary base station, and sends the TDD configuration information of the secondary serving cell and the identity of the secondary serving cell to a terminal.

Optionally, a first implementation manner in this embodiment is as follows:

Before the secondary base station communicates with the terminal, a person skilled in the art sets, for the secondary base station, third duration between a time point at which the TDD configuration information of the secondary serving cell is received and a default time point at which the TDD configuration information of the secondary serving cell takes effect on the secondary base station; sets, for the terminal, fourth duration between a time point at which the TDD configuration information of the secondary serving cell is received and a default time point at which the TDD configuration information of the secondary serving cell takes effect on the terminal; and separately saves the third duration and the fourth duration on the primary base station, where the third duration may be greater than or equal to the fourth duration, and may also be less than the fourth duration.

When the third duration is greater than the fourth duration, the primary base station first sends the TDD configuration information of the secondary serving cell and the identity of the secondary serving cell to the secondary base station, and then sends the TDD configuration information of the secondary serving cell and the identity of the secondary serving cell to the terminal;

when the third duration is equal to the fourth duration, the primary base station sends the TDD configuration information of the secondary serving cell and the identity of the secondary serving cell to the secondary base station and the terminal at the same time; and when the third duration is less than the fourth duration, the primary base station first sends the TDD configuration information of the secondary serving cell and the identity of the secondary serving cell to the terminal, and then sends the TDD configuration information of the secondary serving cell and the identity of the secondary serving cell to the secondary base station.

Optionally, a second implementation manner in this embodiment is as follows:

The primary base station first sends the TDD configuration information of the secondary serving cell and the identity of the secondary serving cell to the secondary base station, and then sends the TDD configuration information of the secondary serving cell and the identity of the secondary serving cell to the terminal.

It should be noted that specific implementation of step 202 in this embodiment is not limited to the foregoing two manners.

203. After receiving the TDD configuration information of the secondary serving cell and the identity of the secondary serving cell that are sent by the primary base station, the secondary base station determines an uplink-downlink subframe allocation of the secondary serving cell according to the TDD configuration information of the secondary serving cell.

Optionally, for the first implementation manner of the foregoing step 202, this step may be specifically implemented by using the following method:

After the secondary base station receives the TDD configuration information of the secondary serving cell and the identity of the secondary serving cell that are sent by the primary base station, and the third duration passes, the secondary base station starts to communicate with the terminal according to the TDD configuration information of the secondary serving cell.

For example, the third duration is 200 subframes, and after the secondary base station receives the TDD configuration information of the secondary serving cell and the identity of the secondary serving cell that are sent by the primary base station, and 200 subframes pass, the secondary base station starts to communicate with the terminal according to the TDD configuration information of the secondary serving cell.

Similarly, after the terminal receives the TDD configuration information of the secondary serving cell and the identity of the secondary serving cell that are sent by the primary base station, and the fourth duration passes, the terminal starts to communicate with the secondary base station according to the TDD configuration information of the secondary serving cell.

For example, the fourth duration is 180 subframes, and after the terminal receives the TDD configuration information of the secondary serving cell and the identity of the secondary serving cell that are sent by the primary base station, and 180 subframes pass, the terminal starts to communicate with the secondary base station according to the TDD configuration information of the secondary serving cell.

It should also be noted that, to ensure that the TDD configuration information of the secondary serving cell takes effect on the secondary serving cell and the terminal at the same time, when the third duration is 200 subframes, the fourth duration is 180 subframes, and the primary base station sends the TDD configuration information of the secondary serving cell and the identity of the secondary serving cell to the secondary base station at the tenth subframe, in this case, the primary base station sends the TDD configuration information of the secondary serving cell and the identity of the secondary serving cell to the terminal at the $30^{th}$ subframe.

Optionally, for the second implementation manner of the foregoing step 202, this step may be specifically implemented by using the following method:

After the secondary base station receives the TDD configuration information of the secondary serving cell and the identity of the secondary serving cell that are sent by the primary base station, the TDD configuration information of the secondary serving cell starts to take effect on the secondary base station. In this case, the secondary base station receives, in an uplink subframe and according to the TDD configuration information of the secondary serving cell, data sent by the terminal; after receiving, in the uplink subframe, the data sent by the terminal, the secondary base station learns that the TDD configuration information of the secondary serving cell has taken effect by default on the terminal; and afterwards, the secondary base station communicates with the terminal according to the TDD configuration information of the secondary serving cell.

Correspondingly, after receiving the TDD configuration information of the secondary serving cell and the identity of the secondary serving cell, the terminal sends the data to the secondary base station in the uplink subframe according to the TDD configuration information of the secondary serving cell, and after receiving data sent by the secondary base station in a downlink subframe, the terminal starts to communicate with the secondary base station according to the TDD configuration information of the secondary serving cell.

It should be noted that specific implementation of step 203 in this embodiment is not limited to the foregoing two manners.

According to the method for implementing time division duplex configuration of a secondary serving cell described in the foregoing FIG. 2, when TDD configuration is performed on a secondary serving cell, a primary base station can proactively determine TDD configuration information for a secondary serving cell which requires TDD configuration, and separately send the TDD configuration information of the secondary serving cell and an identity of the secondary serving cell to a secondary base station and a terminal, so that the secondary base station and the terminal can determine an uplink-downlink subframe allocation of the secondary serving cell according to the TDD configuration information of the secondary serving cell. In this embodiment, after both the secondary base station and the terminal receive the TDD configuration information of the secondary serving cell and the identity of the secondary serving cell that are sent by the primary base station, and determine the uplink-downlink subframe allocation of the secondary serving cell according to the TDD configuration information of the secondary serving cell, TDD configuration of the secondary serving cell is completed. It can be learned that according to the method, when a primary serving cell and a secondary serving cell of a terminal belong to different base stations, TDD configuration of the secondary serving cell can be completed.

Embodiment 2

Figure 3:
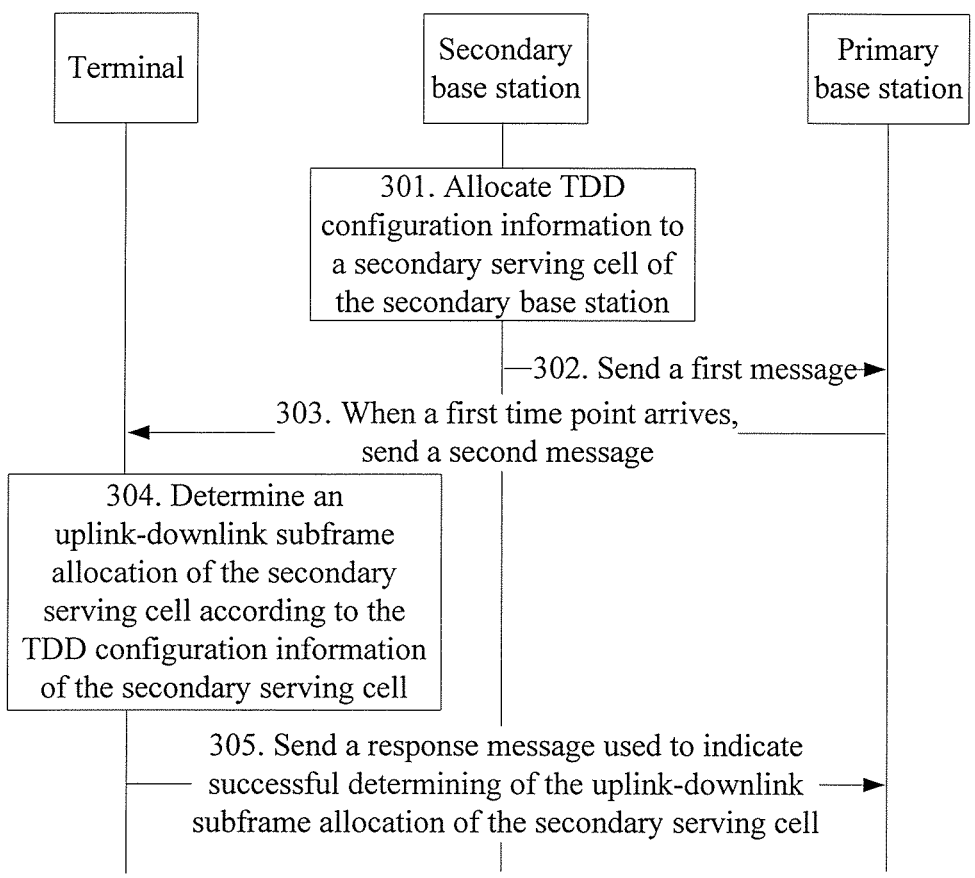
FIG. 3 is a flowchart of a method for implementing time division duplex configuration of a secondary serving cell according to Embodiment 2 of the present invention.

Referring to FIG. 3, FIG. 3 is a flowchart of a method for implementing time division duplex configuration of a secondary serving cell according to this embodiment, and the method specifically includes:

301. A secondary base station determines TDD configuration information for a secondary serving cell of the secondary base station.

A method for determining TDD configuration information for a secondary serving cell of a secondary base station by the secondary base station is the same as a method for determining TDD configuration information for a secondary serving cell by a base station in the prior art, and details are not described herein again.

302. The secondary base station sends a first message to a primary base station, where the first message includes a first time point, the TDD configuration information of the secondary serving cell, and an identity of the secondary serving cell.

The first time point is used to indicate a time at which the primary base station sends a second message to a terminal.

In the method, before the secondary base station communicates with the terminal, a person skilled in the art sets, for the secondary base station, first duration between a time point at which the first message is sent and a default time point at which the TDD configuration information of the secondary serving cell takes effect on the secondary base station; and sets, for the terminal, second duration between a time point at which the second message is received and a default time point at which the TDD configuration information of the secondary serving cell takes effect on the terminal.

It should be noted that, after the secondary base station sends the first message to the primary base station, and the first duration passes, the secondary base station starts to communicate with the terminal according to the TDD configuration information of the secondary serving cell.

For example, the first duration is 200 subframes, and after the secondary base station sends the first message to the primary base station, and 200 subframes pass, the secondary base station starts to communicate with the terminal according to the TDD configuration information of the secondary serving cell.

It should also be noted that, the secondary base station obtains the first time point according to the first duration and the second duration, so as to ensure that the TDD configuration information of the secondary serving cell takes effect on the secondary serving cell and the terminal at the same time. For example, the first duration is 200 subframes, and the second duration is 180 subframes, and the secondary base station sends the first message to the primary base station at the $20^{th}$ subframe, in this case, the first time point determined by the secondary base station is the $40^{th}$ subframe.

303. After the primary base station receives the first message of the secondary serving cell that is sent by the secondary base station, and when the first time point arrives, the primary base station sends a second message to a terminal, where the second message includes the TDD configuration information of the secondary serving cell and the identity of the secondary serving cell.

For example, the first time point is the $40^{th}$ subframe, and the primary base station receives, at the $20^{th}$ subframe, the TDD configuration information of the secondary serving cell and the identity of the secondary serving cell that are sent by the secondary base station, and the primary base station sends the TDD configuration information of the secondary serving cell and the identity of the secondary serving cell to the terminal at the $40^{th}$ subframe.

304. After receiving the second message sent by the primary base station, the terminal determines an uplink-downlink subframe allocation of the secondary serving cell according to the TDD configuration information of the secondary serving cell.

It should be noted that, after the terminal receives the second message sent by the primary base station, and the second duration passes, the terminal starts to communicate with the secondary base station according to the TDD configuration information of the secondary serving cell.

For example, the second duration is 180 subframes, and after the terminal receives the second message sent by the primary base station, and 180 subframes pass, the terminal starts to communicate with the secondary base station according to the TDD configuration information of the secondary serving cell.

305. After determining the uplink-downlink subframe allocation of the secondary serving cell according to the TDD configuration information of the secondary serving cell, the terminal sends, to the primary base station, a response message used to indicate successful determining of the uplink-downlink subframe allocation of the secondary serving cell.

According to a method for implementing time division duplex configuration of a secondary serving cell provided in this embodiment, when TDD configuration is performed on a secondary serving cell, a secondary base station can proactively determine TDD configuration information for a secondary serving cell, which requires TDD configuration, of the secondary base station, and send a first message to a primary base station, where the first message includes a first time point, the TDD configuration information of the secondary serving cell, and an identity of the secondary serving cell; therefore, after receiving the first message sent by the secondary base station, the primary base station sends a second message to a terminal according to the first time point in the first message, where the second message includes the TDD configuration information of the secondary serving cell and the identity of the secondary serving cell, so that the terminal determines an uplink-downlink subframe allocation of the secondary serving cell according to the TDD configuration information of the secondary serving cell. In this embodiment, after the terminal receives the second message sent by the primary base station, and determines the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect, first duration between a time point at which a secondary base station sends a first message and a time point at which TDD configuration information of the secondary serving cell takes effect on the secondary base station is preset, and second duration between a time point at which the terminal receives a second message and a time point at which the TDD configuration information of the secondary serving cell takes effect is set, so that a primary base station sends the second message to the terminal at a first time point, thereby ensuring that the TDD configuration information of the secondary serving cell takes effect on the secondary base station and on the terminal simultaneously.

Embodiment 3

Figure 4:
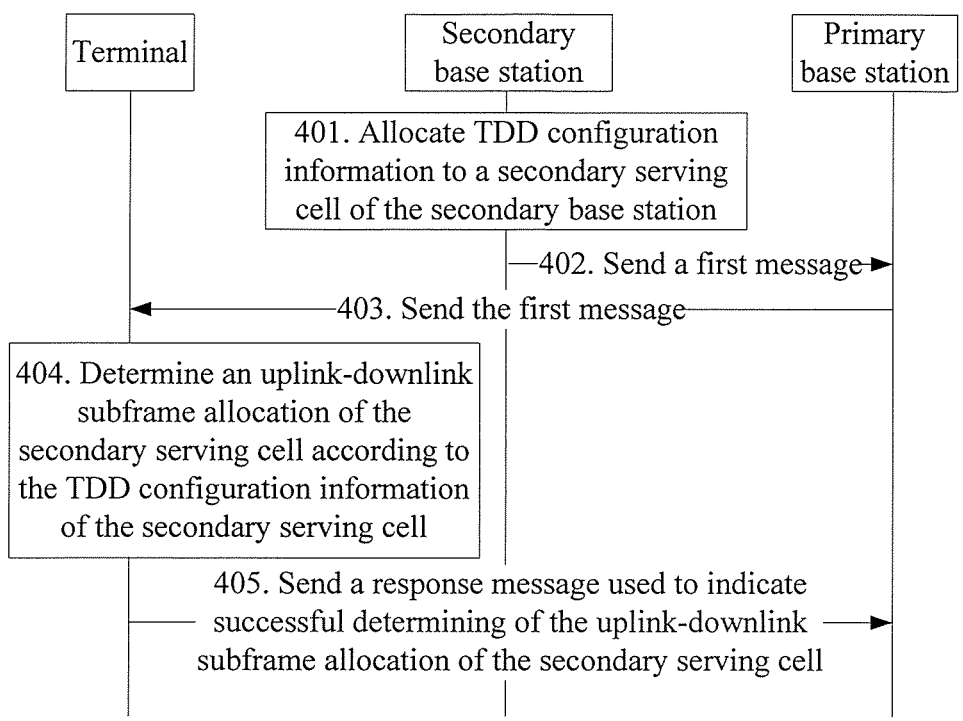
FIG. 4 is a flowchart of a method for implementing time division duplex configuration of a secondary serving cell according to Embodiment 3 of the present invention.

Referring to FIG. 4, FIG. 4 is a flowchart of a method for implementing time division duplex configuration of a secondary serving cell according to this embodiment, and the method specifically includes:

401. A secondary base station determines TDD configuration information for a secondary serving cell of the secondary base station.

A method for determining TDD configuration information for a secondary serving cell of a secondary base station by the secondary base station is the same as a method for determining TDD configuration information for a secondary serving cell by a base station in the prior art, and details are not described herein again.

402. The secondary base station sends a first message to a primary base station, where the first message includes a second time point, the TDD configuration information of the secondary serving cell, and an identity of the secondary serving cell.

The second time point is a time at which the TDD configuration information of the secondary serving cell takes effect separately on the secondary base station and a terminal.

It should be noted that, after the secondary base station sends the first message to the primary base station, at the second time point, the secondary base station starts to communicate with the terminal according to the TDD configuration information of the secondary serving cell.

For example, the second time point is the $200^{th}$ subframe, and after the secondary base station sends the first message to the primary base station, the secondary base station starts to communicate with the terminal at the $200^{th}$ subframe according to the TDD configuration information of the secondary serving cell.

403. After the primary base station receives the first message of the secondary serving cell that is sent by the secondary base station, and before the second time point arrives, the primary base station sends the first message to a terminal.

404. After receiving the first message sent by the primary base station, the terminal determines an uplink-downlink subframe allocation of the secondary serving cell according to the TDD configuration information of the secondary serving cell.

It should be noted that, after the terminal receives the first message sent by the primary base station, the terminal starts to communicate with the secondary base station at the second time point according to the TDD configuration information of the secondary serving cell.

For example, the second time point is the $200^{th}$ subframe, and when the terminal receives the first message sent by the primary base station, the terminal starts to communicate with the secondary base station at the $200^{th}$ subframe according to the TDD configuration information of the secondary serving cell.

405. After determining the uplink-downlink subframe allocation of the secondary serving cell according to the TDD configuration information of the secondary serving cell, the terminal sends, to the primary base station, a response message used to indicate successful determining of the uplink-downlink subframe allocation of the secondary serving cell.

According to a method for implementing time division duplex configuration of a secondary serving cell provided in this embodiment, when TDD configuration is performed on the secondary serving cell, a secondary base station can proactively determine TDD configuration information for the secondary serving cell, which requires TDD configuration, of the secondary base station, and send a first message to a primary base station, where the first message includes a second time point, the TDD configuration information of the secondary serving cell, and an identity of the secondary serving cell; therefore, after receiving the first message sent by the secondary base station, the primary base station sends the first message to a terminal, so that the terminal determines an uplink-downlink subframe allocation of the secondary serving cell according to the TDD configuration information of the secondary serving cell. In this embodiment, after the terminal receives the first message sent by the primary base station, and determines the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect, a first message includes a second time point; therefore, after receiving the first message, the terminal can enable TDD configuration information of the secondary serving cell to take effect at the second time point, thereby ensuring that the TDD configuration information of the secondary serving cell takes effect on a secondary base station and on the terminal simultaneously.

Embodiment 4

Figure 5:
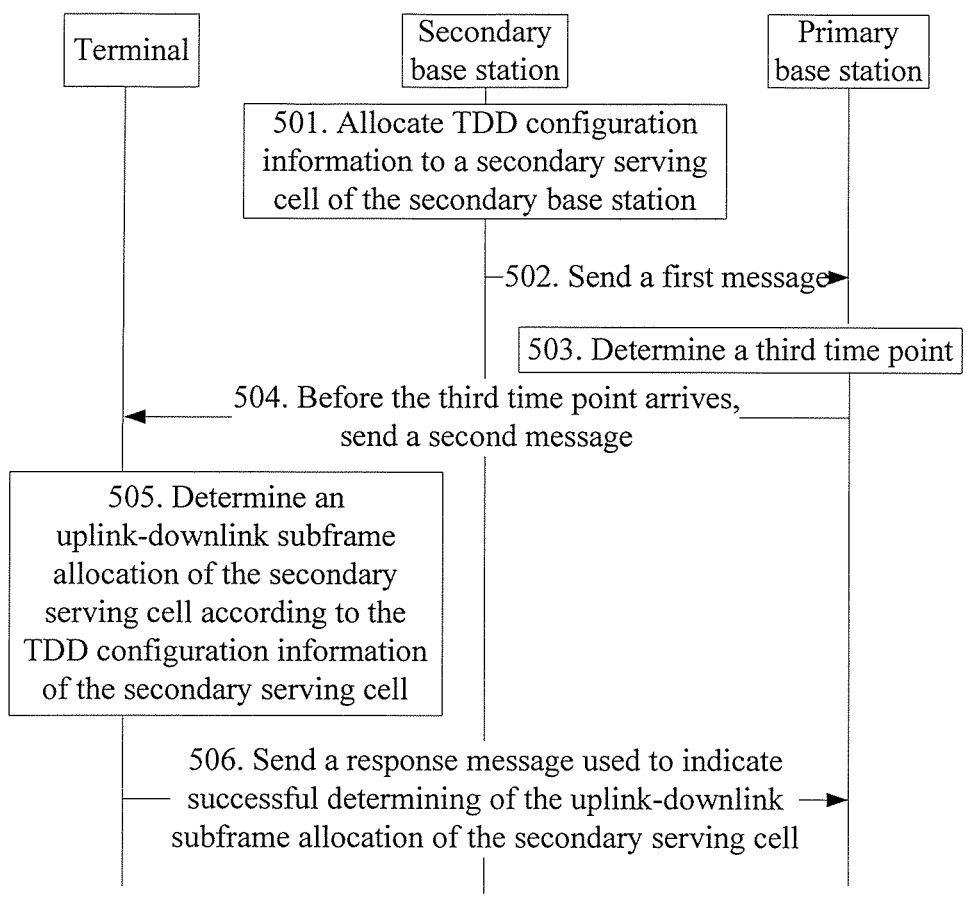
FIG. 5 is a flowchart of a method for implementing time division duplex configuration of a secondary serving cell according to Embodiment 4 of the present invention.

Referring to FIG. 5, FIG. 5 is a flowchart of a method for implementing time division duplex configuration of a secondary serving cell according to this embodiment, and the method specifically includes:

501. A secondary base station determines TDD configuration information for a secondary serving cell of the secondary base station.

A method for determining TDD configuration information for a secondary serving cell of a secondary base station by the secondary base station is the same as a method for determining TDD configuration information for a secondary serving cell by a base station in the prior art, and details are not described herein again.

502. The secondary base station sends a first message to a primary base station, where the first message includes the TDD configuration information of the secondary serving cell and an identity of the secondary serving cell.

In the method, before the secondary base station communicates with a terminal, a person skilled in the art sets, for the secondary base station, first duration between a time point at which the first message is sent and a default time point at which the TDD configuration information of the secondary serving cell takes effect on the secondary base station.

It should be noted that, after the secondary base station sends the first message to the primary base station, and the first duration passes, the secondary base station starts to communicate with the terminal according to the TDD configuration information of the secondary serving cell.

For example, the first duration is 200 subframes, and after the secondary base station sends the first message to the primary base station, and 200 subframes pass, the secondary base station starts to communicate with the terminal according to the TDD configuration information of the secondary serving cell.

503. After receiving the first message sent by the secondary base station, the primary base station determines a third time point.

The third time point is a default time at which the TDD configuration information of the secondary serving cell takes effect on the terminal.

A method for determining the third time point by the primary base station is specifically as follows:

The primary base station obtains the third time point by adding prestored first duration to a time point at which the first message is received.

It should be noted that, a delay between the primary base station and the secondary base station is ignored; therefore, the foregoing time point at which the primary base station receives the first message sent by the secondary base station is the same as a time point at which the secondary base station sends the first message to the primary base station.

For example, the time point at which the primary base station receives the first message sent by the secondary base station is the 30$^{th}$ subframe, the first duration is 100 subframes, and the third time point determined by the primary base station is the 130$^{th}$ subframe.

504. Before the third time point arrives, the primary base station sends a second message to a terminal, where the second message includes the third time point, the TDD configuration information of the secondary serving cell, and the identity of the secondary serving cell.

505. After receiving the second message sent by the primary base station, the terminal determines an uplink-downlink subframe allocation of the secondary serving cell according to the TDD configuration information of the secondary serving cell.

It should be noted that, when the terminal receives the second message sent by the primary base station, the terminal starts to communicate with the secondary base station at the third time point according to the TDD configuration information of the secondary serving cell.

For example, the third time point is the 130$^{th}$ subframe, and when the terminal receives the second message sent by the primary base station, the terminal starts to communicate with the secondary base station at the 130$^{th}$ subframe according to the TDD configuration information of the secondary serving cell.

506. After determining the uplink-downlink subframe allocation of the secondary serving cell according to the TDD configuration information of the secondary serving cell, the terminal sends, to the primary base station, a response message used to indicate successful determining of the uplink-downlink subframe allocation of the secondary serving cell.

According to a method for implementing time division duplex configuration of a secondary serving cell provided in this embodiment, when TDD configuration is performed on the secondary serving cell, a secondary base station can proactively determine TDD configuration information for the secondary serving cell, which requires TDD configuration, of the secondary base station, and send a first message to a primary base station, where the first message includes the TDD configuration information of the secondary serving cell and an identity of the secondary serving cell; therefore, after receiving the first message sent by the secondary base station, the primary base station determines a third time point, and sends a second message to a terminal, where the second message includes the third time point, the TDD configuration information of the secondary serving cell, and the identity of the secondary serving cell, so that the terminal determines an uplink-downlink subframe allocation of the secondary serving cell according to the TDD configuration information of the secondary serving cell. In this embodiment, after the terminal receives the second message sent by the primary base station, and determines the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect, first duration between a time point at which a secondary base station sends a first message and a time point at which TDD configuration information of the secondary serving cell takes effect on the secondary base station is preset; therefore, a primary base station can determine a third time point according to the first duration, and further, after receiving a second message, the terminal can enable TDD configuration of the secondary serving cell to take effect at the third time point, thereby ensuring that the TDD configuration information of the secondary serving cell takes effect on the secondary base station and on the terminal simultaneously.

Embodiment 5

Figure 6:
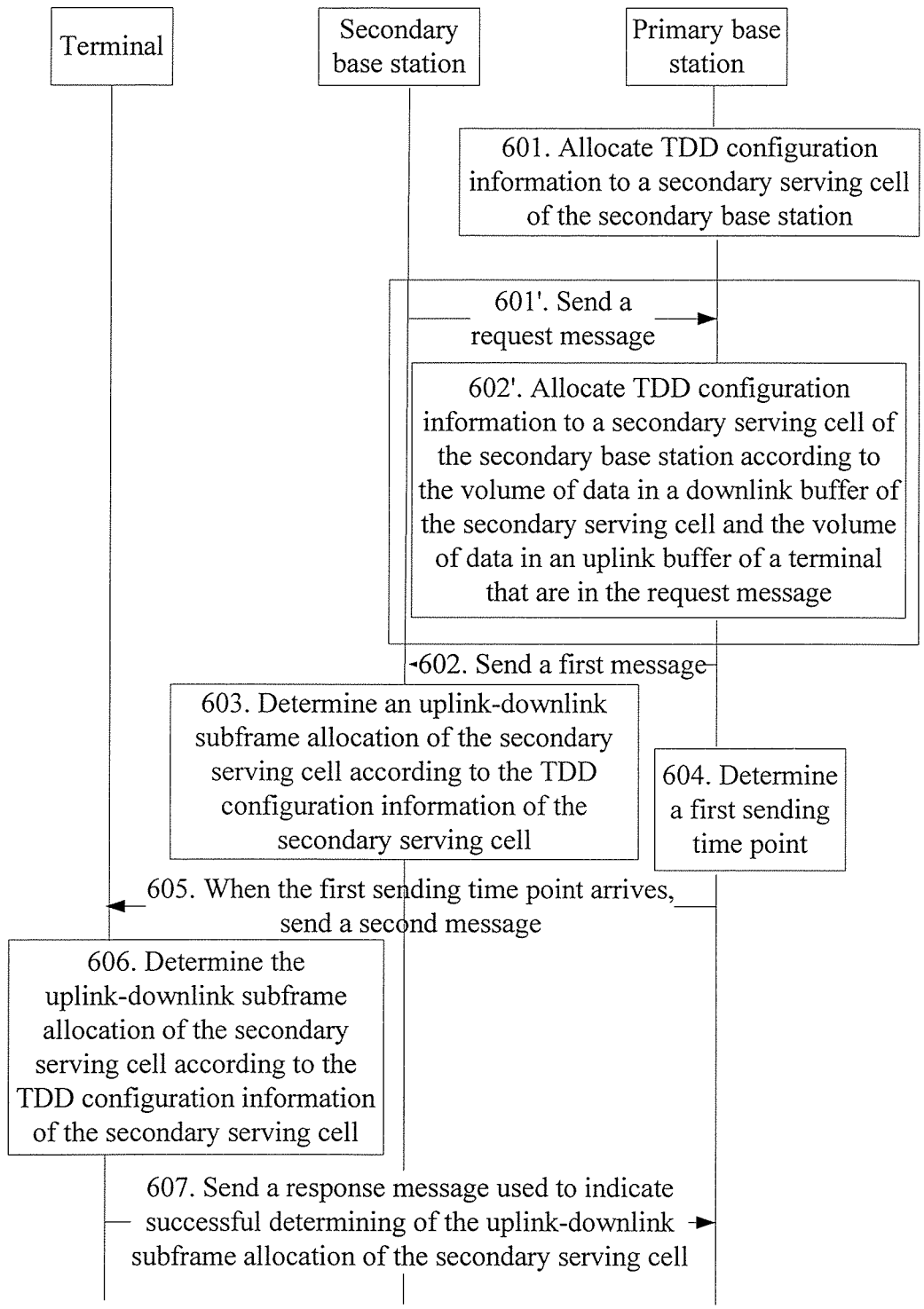
FIG. 6 is a flowchart of a method for implementing time division duplex configuration of a secondary serving cell according to Embodiment 5 of the present invention.

Referring to FIG. 6, FIG. 6 is a flowchart of a method for implementing time division duplex configuration of a secondary serving cell according to this embodiment, and the method specifically includes:

601. A primary base station determines TDD configuration information for a secondary serving cell of a secondary base station.

It should be noted that, to enable the primary base station to determine relatively accurate TDD configuration information for the secondary serving cell of the secondary base station, the foregoing step 601 may further be replaced with the following steps:

601'. A secondary base station sends a request message to a primary base station, where the request message includes the volume of data in a downlink buffer of a secondary serving cell and the volume of data in an uplink buffer of a terminal.

Before step 601', this embodiment further includes the following step:

The secondary base station receives buffer status report information sent by the terminal, and determines the volume of data in the uplink buffer of the terminal according to the buffer status report information.

Specifically, this step may be implemented in the following manner:

The secondary base station receives each piece of latest buffer status report information sent by each of multiple terminals that communicate with the secondary base station, and averages the volume of data included in buffer status report information sent by the multiple terminals, to obtain the volume of data in the uplink buffer of each terminal; or the secondary base station receives multiple pieces of buffer status report information sent by any terminal that communicates with the secondary base station, and averages the volume of data included in the multiple pieces of buffer status report information, to obtain the volume of data in the uplink buffer of the terminal; or the secondary base station separately receives multiple pieces of buffer status report information sent by multiple terminals that communicate with the secondary base station, and averages the volume of data included in the multiple pieces of buffer status report information sent by the multiple terminals, to obtain the volume of data in the uplink buffer of each terminal.

602'. The primary base station determines TDD configuration information for the secondary serving cell of the secondary base station according to the volume of data in the downlink buffer of the secondary serving cell and the volume of data in the uplink buffer of the terminal that are in the request message.

For example, the foregoing volume of data in the downlink buffer of the secondary serving cell is 1000 bits, the volume of data in the uplink buffer of the terminal is 1500 bits, and one frame may be divided into 10 timeslots in the TDD configuration information determined by the primary base station for the secondary serving cell, that is, each timeslot is one subframe, and it is specified that the first to the sixth subframes in one frame are used by the terminal to send uplink data to the secondary base station, and the seventh to the tenth subframes in one frame are used by the secondary base station to send downlink data to the terminal.

602. The primary base station sends a first message to the secondary base station, where the first message includes a first time point, the TDD configuration information of the secondary serving cell, and an identity of the secondary serving cell.

The first time point is a default time at which the TDD configuration information of the secondary serving cell takes effect on the secondary base station.

603. The secondary base station receives the first message sent by the primary base station, and determines an uplink-downlink subframe allocation of the secondary serving cell according to the TDD configuration information of the secondary serving cell.

It should be noted that, after the secondary base station receives the first message sent by the primary base station, the secondary base station starts to communicate with the terminal at the first time point according to the TDD configuration information of the secondary serving cell.

For example, the first time point is the $100^{th}$ subframe, and after the secondary base station receives the first message sent by the primary base station, the secondary base station starts to communicate with the terminal at the $100^{th}$ subframe according to the TDD configuration information of the secondary serving cell.

604. The primary base station determines a first sending time point.

The first sending time point is a time point at which the primary base station sends a second message to the terminal, and the first sending time point is a time point obtained by subtracting prestored first duration from the first time point.

In the method, before the secondary base station communicates with the terminal, the foregoing first duration is a time interval, which is set by a person skilled in the art for the terminal, between a time point at which the second message is received and a default time point at which the TDD configuration information of the secondary serving cell takes effect on the terminal, and the first duration is saved on the primary base station.

For example, the first time point is the $1000^{th}$ subframe, the prestored first duration is 200 subframes, and the first sending time point is the $800^{th}$ subframe.

It should be noted that the sequence for performing this step 604 and the foregoing step 603 is not limited.

605. When the first sending time point arrives, the primary base station sends the second message to the terminal, where the second message includes the TDD configuration information of the secondary serving cell and the identity of the secondary serving cell.

For example, the first sending time point is the $800^{th}$ subframe, and when the $800^{th}$ subframe arrives, the primary base station sends the second message to the terminal.

606. After receiving the second message sent by the primary base station, the terminal determines the uplink-downlink subframe allocation of the secondary serving cell according to the TDD configuration information of the secondary serving cell.

It should be noted that, after the terminal receives the second message sent by the primary base station, and the first duration passes, the terminal starts to communicate with the secondary base station according to the TDD configuration information of the secondary serving cell.

For example, the first duration is 200 subframes, and after the terminal receives the second message sent by the primary base station, and 200 subframes pass, the terminal starts to communicate with the secondary base station according to the TDD configuration information of the secondary serving cell.

607. After determining the uplink-downlink subframe allocation of the secondary serving cell according to the TDD configuration information of the secondary serving cell, the terminal sends, to the primary base station, a response message used to indicate successful determining of the uplink-downlink subframe allocation of the secondary serving cell.

According to a method for implementing time division duplex configuration of a secondary serving cell provided in this embodiment, when TDD configuration is performed on the secondary serving cell, a primary base station can proactively determine TDD configuration information for the secondary serving cell which requires TDD configuration; send a first message to a secondary base station, where the first message includes a first time point, the TDD configuration information of the secondary serving cell, and an identity of the secondary serving cell; and send a second message to a terminal, where the second message includes the TDD configuration information of the secondary serving cell and the identity of the secondary serving cell, so that the secondary base station and the terminal can determine an uplink-downlink subframe allocation of the secondary serving cell according to the TDD configuration information of the secondary serving cell. In this embodiment, after the secondary base station receives the first message sent by the primary base station, the terminal receives the second message sent by the primary base station, and both the secondary base station and the terminal determine the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect of this embodiment, first duration between a time point at which the terminal receives a second message and a time point at which TDD configuration information of the secondary serving cell takes effect is preset; therefore, a primary base station can determine, according to a first time point and the first duration, a first sending time point at which a second message is sent to the terminal, and send the second message to the terminal at the first sending time point, thereby ensuring that the TDD configuration information of the secondary serving cell takes effect on a secondary base station and on the terminal simultaneously.

Embodiment 6

Figure 7:
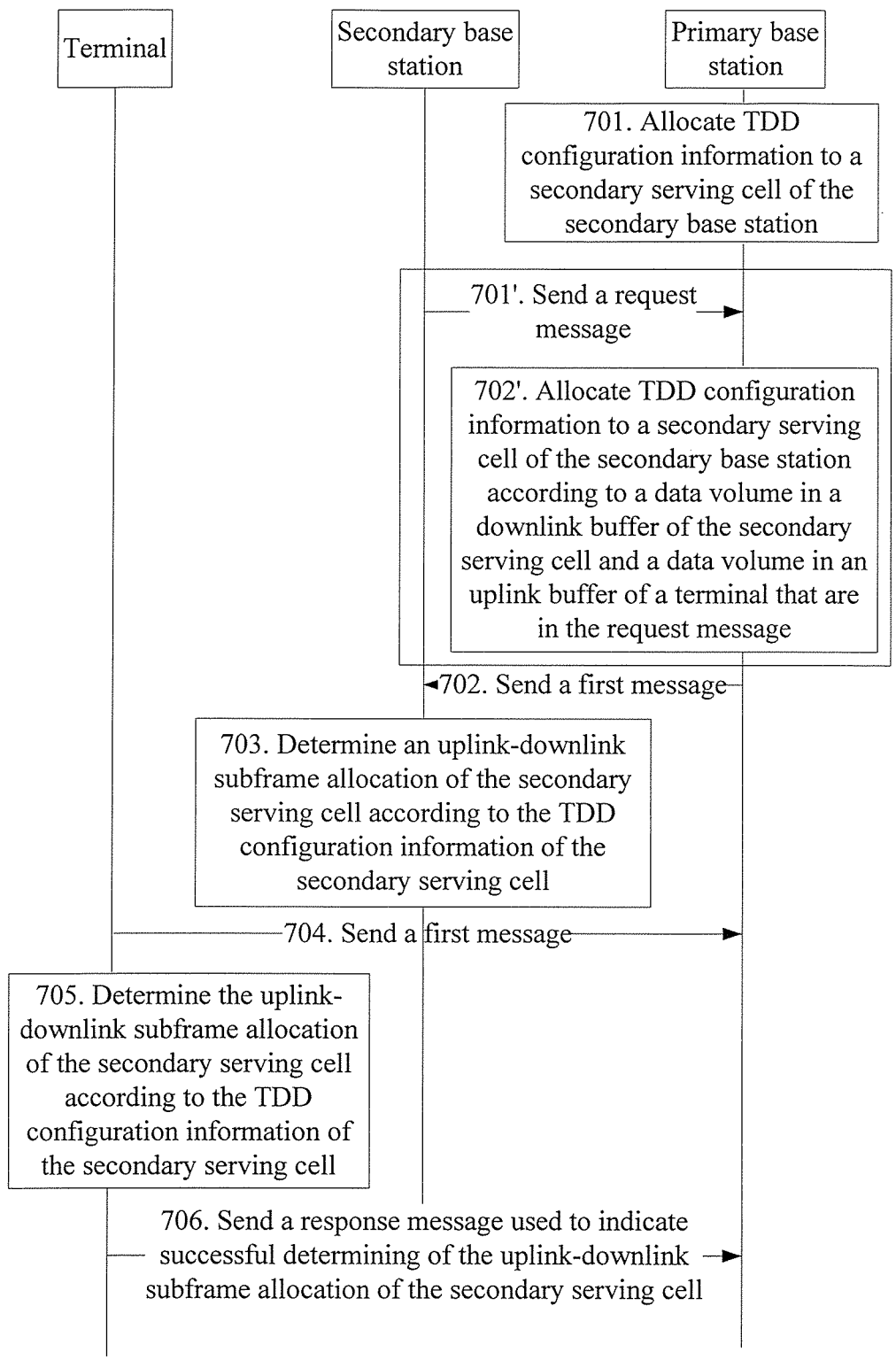
FIG. 7 is a flowchart of a method for implementing time division duplex configuration of a secondary serving cell according to Embodiment 6 of the present invention.

Referring to FIG. 7, FIG. 7 is a flowchart of a method for implementing time division duplex configuration of a secondary serving cell according to this embodiment, and the method specifically includes:

701. A primary base station determines TDD configuration information for a secondary serving cell of a secondary base station.

It should be noted that, to enable the primary base station to determine relatively accurate TDD configuration information for the secondary serving cell of the secondary base station, the foregoing step 701 may further be replaced with the following steps:

701'. A secondary base station sends a request message to a primary base station, where the request message includes the volume of data in a downlink buffer of a secondary serving cell and the volume of data in an uplink buffer of a terminal.

Before step 701', this embodiment further includes the following step:

The secondary base station receives buffer status report information sent by the terminal, and determines the volume of data in the uplink buffer of the terminal according to the buffer status report information.

Specifically, this step may be specifically implemented in the following manner:

The secondary base station receives each piece of latest buffer status report information sent by each of multiple terminals that communicate with the secondary base station, and averages the volume of data included in buffer status report information sent by the multiple terminals, to obtain the volume of data in the uplink buffer of each terminal; or the secondary base station receives multiple pieces of buffer status report information sent by any terminal that communicates with the secondary base station, and averages the volume of data included in the multiple pieces of buffer status report information, to obtain the volume of data in the uplink buffer of the terminal; or the secondary base station separately receives multiple pieces of buffer status report information sent by multiple terminals that communicate with the secondary base station, and averages the volume of data included in the multiple pieces of buffer status report information sent by the multiple terminals, to obtain the volume of data in the uplink buffer of each terminal.

702'. The primary base station receives the request message sent by the secondary base station, and determines TDD configuration information for the secondary serving cell of the secondary base station according to the volume of data in the downlink buffer of the secondary serving cell and the volume of data in the uplink buffer of the terminal.

A specific implementation manner of this step is the same as that of the foregoing step 602', and is not exemplified herein again.

702. The primary base station sends a first message to the secondary base station, where the first message includes a second time point, the TDD configuration information of the secondary serving cell, and an identity of the secondary serving cell.

The second time point is a time at which the TDD configuration information of the secondary serving cell takes effect simultaneously on the secondary base station and a terminal.

703. The secondary base station receives the first message sent by the primary base station, and determines an uplink-downlink subframe allocation of the secondary serving cell according to the TDD configuration information of the secondary serving cell.

It should be noted that, when the secondary base station receives the first message sent by the primary base station, the secondary base station starts to communicate with the terminal at the second time point according to the TDD configuration information of the secondary serving cell.

For example, the second time point is the $100^{th}$ subframe, and when the secondary base station receives the first message sent by the primary base station, the secondary base station starts to communicate with the terminal at the $100^{th}$ subframe according to the TDD configuration information of the secondary serving cell.

704. The primary base station sends a first message to a terminal.

It should be noted that, in this embodiment, this step 704 may further be performed before the foregoing step 702, and this step 704 and the foregoing step 702 may also be performed at the same time.

705. After receiving the first message sent by the primary base station, the terminal determines an uplink-downlink subframe allocation of the secondary serving cell according to the TDD configuration information of the secondary serving cell.

It should be noted that, when the terminal receives the first message sent by the primary base station, the terminal starts to communicate with the secondary base station at the second time point according to the TDD configuration information of the secondary serving cell.

For example, the second time point is the $100^{th}$ subframe, and when the terminal receives the first message sent by the primary base station, the terminal starts to communicate with the secondary base station at the $100^{th}$ subframe according to the TDD configuration information of the secondary serving cell.

706. After determining the uplink-downlink subframe allocation of the secondary serving cell according to the TDD configuration information of the secondary serving cell, the terminal sends, to the primary base station, a response message used to indicate successful determining of the uplink-downlink subframe allocation of the secondary serving cell.

According to a method for implementing time division duplex configuration of a secondary serving cell provided in this embodiment, when TDD configuration is performed on the secondary serving cell, a primary base station can proactively determine TDD configuration information for the secondary serving cell which requires TDD configuration; send a first message to a terminal, where the first message includes a second time point, the TDD configuration information of the secondary serving cell, and an identity of the secondary serving cell; and send a first message to a secondary base station, so that the secondary base station and the terminal can determine an uplink-downlink subframe allocation of the secondary serving cell according to the TDD configuration information of the secondary serving cell. In this embodiment, after both the secondary base station and the terminal receive first messages sent by the primary base station, and both the secondary base station and the terminal determine the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect of this embodiment, first messages sent by a primary base station to a secondary base station and the terminal include a second time point; therefore, both the secondary base station and the terminal can enable TDD configuration information of the secondary serving cell to take effect at the second time point, thereby ensuring that the TDD configuration information of the secondary serving cell takes effect on the secondary base station and on the terminal simultaneously.

Embodiment 7

Figure 8:
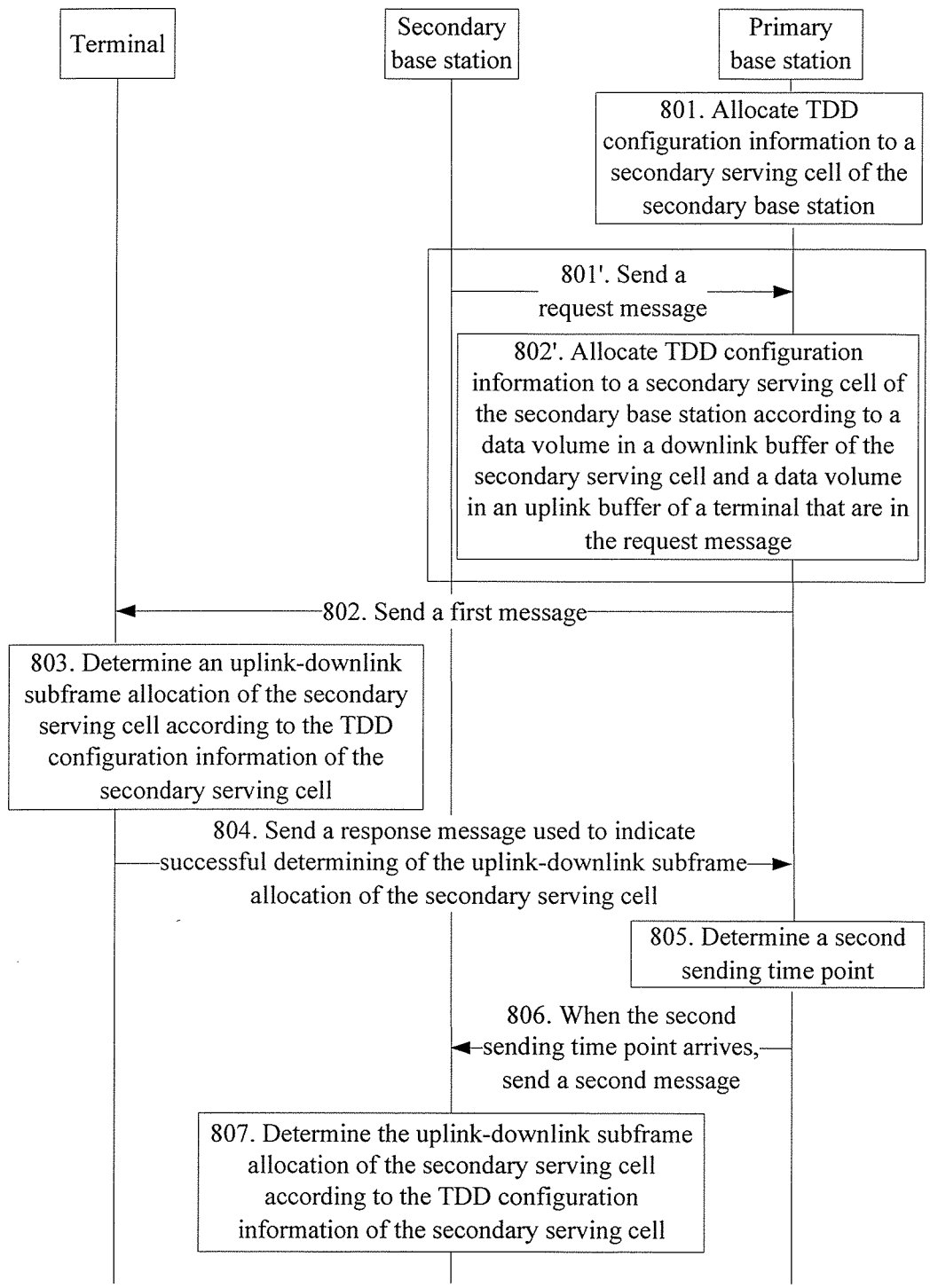
FIG. 8 is a flowchart of a method for implementing time division duplex configuration of a secondary serving cell according to Embodiment 7 of the present invention.

Referring to FIG. 8, FIG. 8 is a flowchart of a method for implementing time division duplex configuration of a secondary serving cell according to this embodiment, and the method specifically includes:

801. A primary base station determines TDD configuration information for a secondary serving cell of a secondary base station.

It should be noted that, to enable the primary base station to determine relatively accurate TDD configuration information for the secondary serving cell of the secondary base station, the foregoing step 801 may further be replaced with the following steps:

801'. A secondary base station sends a request message to a primary base station, where the request message includes the volume of data in a downlink buffer of a secondary serving cell and the volume of data in an uplink buffer of a terminal.

Before step 801', this embodiment further includes the following step:

The secondary base station receives buffer status report information sent by the terminal, and determines the volume of data in the uplink buffer of the terminal according to the buffer status report information.

Specifically, this step may be specifically implemented in the following manner:

The secondary base station receives each piece of latest buffer status report information sent by each of multiple terminals that communicate with the secondary base station, and averages the volume of data included in buffer status report information sent by the multiple terminals, to obtain the volume of data in the uplink buffer of each terminal; or the secondary base station receives multiple pieces of buffer status report information sent by any terminal that communicates with the secondary base station, and averages the volume of data included in the multiple pieces of buffer status report information, to obtain the volume of data in the uplink buffer of the terminal; or the secondary base station separately receives multiple pieces of buffer status report information sent by multiple terminals that communicate with the secondary base station, and averages the volume of data included in the multiple pieces of buffer status report information sent by the multiple terminals, to obtain the volume of data in the uplink buffer of each terminal.

802'. The primary base station receives the request message sent by the secondary base station, and determines TDD configuration information for the secondary serving cell of the secondary base station according to the volume of data in the downlink buffer of the secondary serving cell and the volume of data in the uplink buffer of the terminal.

A specific implementation manner of this step is the same as that of the foregoing step 602', and is not exemplified herein again.

802. The primary base station sends a first message to a terminal, where the first message includes a third time point, the TDD configuration information of the secondary serving cell, and an identity of the secondary serving cell.

The third time point is a default time at which the TDD configuration information of the secondary serving cell takes effect on the terminal.

803. After receiving the first message sent by the primary base station, the terminal determines an uplink-downlink subframe allocation of the secondary serving cell according to the TDD configuration information of the secondary serving cell.

It should be noted that, when the terminal receives the first message sent by the primary base station, the terminal starts to communicate with the secondary base station at the third time point according to the TDD configuration information of the secondary serving cell.

For example, the third time point is the $1000^{th}$ subframe, and when the terminal receives the first message sent by the primary base station, the terminal starts to communicate with the secondary base station at the $1000^{th}$ subframe according to the TDD configuration information of the secondary serving cell.

804. After determining the uplink-downlink subframe allocation of the secondary serving cell according to the TDD configuration information of the secondary serving cell, the terminal sends, to the primary base station, a response message used to indicate successful determining of the uplink-downlink subframe allocation of the secondary serving cell.

805. The primary base station determines a second sending time point.

The second sending time point is a time point at which the primary base station sends a second message to the secondary base station, and the second sending time point is a time point obtained by subtracting prestored second duration from the third time point.

In the method, before the secondary base station communicates with the terminal, the foregoing second duration is a time interval, which is set by a person skilled in the art for the secondary base station, between a time point at which the second message is received and a default time point at which the TDD configuration information of the secondary serving cell takes effect on the secondary base station, and the second duration is saved on the primary base station.

For example, the third time point is the $1000^{th}$ subframe, the prestored second duration is 200 subframes, and the second sending time point is the $800^{th}$ subframe.

It should be noted that the sequence for performing this step 805 and the foregoing step 803 is not limited.

806. When the second sending time point arrives, the primary base station sends the second message to the secondary base station, where the second message includes the TDD configuration information of the secondary serving cell and the identity of the secondary serving cell.

For example, the second sending time point is the $800^{th}$ subframe, and when the $800^{th}$ subframe arrives, the primary base station sends the second message to the secondary base station.

807. The secondary base station receives the second message sent by the primary base station, and determines the uplink-downlink subframe allocation of the secondary serving cell according to the TDD configuration information of the secondary serving cell.

It should be noted that, when the secondary base station receives the second message sent by the primary base station, the secondary base station starts to communicate with the terminal at the third time point according to the TDD configuration information of the secondary serving cell.

For example, the third time point is the $1000^{th}$ subframe, and when the secondary base station receives the second message sent by the primary base station, the secondary base station starts to communicate with the terminal at the $1000^{th}$ subframe according to the TDD configuration information of the secondary serving cell.

According to a method for implementing time division duplex configuration of a secondary serving cell provided in this embodiment, when TDD configuration is performed on the secondary serving cell, a primary base station can proactively determine TDD configuration information for the secondary serving cell which requires TDD configuration; send a first message to a terminal, where the first message includes a third time point, the TDD configuration information of the secondary serving cell, and an identity of the secondary serving cell; and send a second message to a secondary base station, where the second message includes the TDD configuration information of the secondary serving cell and the identity of the secondary serving cell, so that the secondary base station and the terminal can determine an uplink-downlink subframe allocation of the secondary serving cell according to the TDD configuration information of the secondary serving cell. In this embodiment, after the terminal receives the first message sent by the primary base station, the secondary base station receives the second message sent by the primary base station, and both the terminal and the secondary base station determine the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect of this embodiment, second duration between a time point at which a secondary base station receives a first message and a time point at which TDD configuration information of the secondary serving cell takes effect is preset; therefore, a primary base station can determine, according to a third time point and the second duration, a second sending time point at which a second message is sent to the secondary base station, thereby ensuring that the TDD configuration information of the secondary serving cell takes effect on the secondary base station and on the terminal simultaneously.

Embodiment 8

Figure 9:
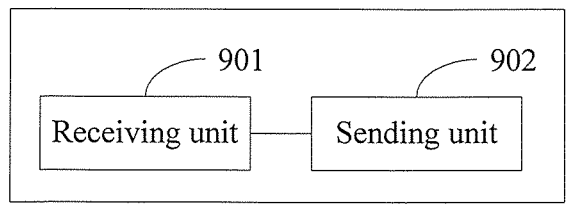
FIG. 9 is a structural diagram of a primary base station according to Embodiment 8 of the present invention.

Referring to FIG. 9, FIG. 9 is a structural diagram of a primary base station 900 according to this embodiment, and the primary base station 900 includes:

a receiving unit 901, configured to: receive time division duplex TDD configuration information of a secondary serving cell and an identity of the secondary serving cell that are sent by a secondary base station, where the TDD configuration information of the secondary serving cell is determined by the secondary base station for the secondary serving cell; and send the TDD configuration information of the secondary serving cell and the identity of the secondary serving cell to a sending unit 902; and the sending unit 902, configured to: receive the TDD configuration information of the secondary serving cell and the identity of the secondary serving cell that are sent by the foregoing receiving unit, and send the TDD configuration information of the secondary serving cell and the identity of the secondary serving cell to a terminal, so that the terminal determines an uplink-downlink subframe allocation of the secondary serving cell according to the TDD configuration information.

Further, the foregoing receiving unit 901 is specifically configured to: receive a first message sent by the secondary base station, where the first message includes a first time point, the TDD configuration information of the secondary serving cell of the secondary base station, and the identity of the secondary serving cell, and the first time point is used to indicate a time at which the primary base station sends a second message to the terminal; and send the first message to the sending unit 902; and the foregoing sending unit 902 is specifically configured to: receive the first message sent by the receiving unit 901, and when the first time point arrives, send the second message to the terminal, where the second message includes the TDD configuration information of the secondary serving cell and the identity of the secondary serving cell.

Further, the foregoing receiving unit 901 is specifically configured to: receive a first message sent by the secondary base station, where the first message includes a second time point, the TDD configuration information of the secondary serving cell of the secondary base station, and the identity of the secondary serving cell, and the second time point is a time at which the TDD configuration information of the secondary serving cell takes effect separately on the secondary base station and the terminal; and send the first message to the sending unit; and the foregoing sending unit 902 is specifically configured to: receive the first message sent by the foregoing receiving unit 901, and before the second time point arrives, send the first message to the terminal.

Figure 10:
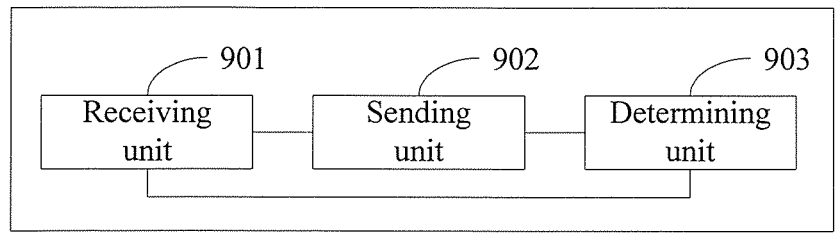
FIG. 10 is a structural diagram of another primary base station according to Embodiment 8 of the present invention.

Further, referring to FIG. 10, the foregoing primary base station further includes:

a determining unit 903, configured to: after the receiving unit 901 receives the TDD configuration information of the secondary serving cell and the identity of the secondary serving cell, determine a third time point, and send the third time point to the sending unit 902, where:

the third time point is a time point obtained by adding prestored first duration to a time point at which the receiving unit 901 receives the TDD configuration information of the secondary serving cell and the identity of the secondary serving cell, the third time point is a default time at which the TDD configuration information of the secondary serving cell takes effect on the terminal, and the first duration is a time interval between a time point at which the terminal receives the second message and a default time point at which the TDD configuration information of the secondary serving cell takes effect on the terminal, where:

the foregoing sending unit 902 is specifically configured to: receive the third time point sent by the foregoing determining unit 903, and before the third time point arrives, send a second message to the terminal, where the second message includes the third time point, the TDD configuration information of the secondary serving cell, and the identity of the secondary serving cell.

According to a primary base station provided in this embodiment, when TDD configuration is performed on a secondary serving cell, the primary base station can receive TDD configuration information of the secondary serving cell and an identity of the secondary serving cell that are sent by a secondary base station, and the primary base station can send the TDD configuration information of the secondary serving cell and the identity of the secondary serving cell to a terminal, so that the terminal determines an uplink-downlink subframe allocation of the secondary serving cell according to the TDD configuration information of the secondary serving cell. In this embodiment, after the terminal receives the TDD configuration information of the secondary serving cell and the identity of the secondary serving cell that are sent by the primary base station, and determines the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect, it is ensured that the TDD configuration information of the secondary serving cell takes effect on a secondary base station and on the terminal simultaneously.

Embodiment 9

Figure 11:
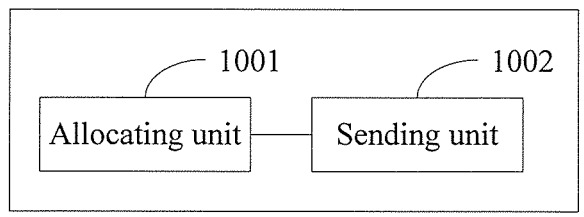
FIG. 11 is a structural diagram of a primary base station according to Embodiment 9 of the present invention.

Referring to FIG. 11, FIG. 11 is a structural diagram of a primary base station 1000 according to this embodiment, and the primary base station 1000 includes:

an allocating unit 1001, configured to: determine time division duplex TDD configuration information for a secondary serving cell of a secondary base station, and send the TDD configuration information of the secondary serving cell to a sending unit 1002; and the sending unit 1002, configured to: receive the TDD configuration information of the secondary serving cell that is sent by the foregoing allocating unit 1001, send the TDD configuration information of the secondary serving cell and an identity of the secondary serving cell to the secondary base station, and send the TDD configuration information of the secondary serving cell and the identity of the secondary serving cell to a terminal, so that the secondary base station and the terminal determine an uplink-downlink subframe allocation of the secondary serving cell according to the TDD configuration information of the secondary serving cell.

Further, the foregoing sending unit 1002 is specifically configured to send a first message to the secondary base station, where the first message includes a first time point, the TDD configuration information of the secondary serving cell, and the identity of the secondary serving cell, and the first time point is a default time at which the TDD configuration information of the secondary serving cell takes effect on the secondary base station.

Figure 12:
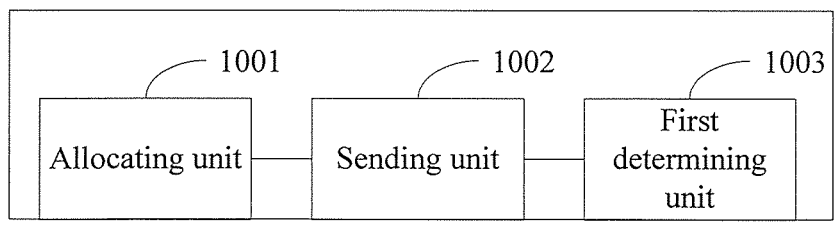
FIG. 12 is a structural diagram of a second primary base station according to Embodiment 9 of the present invention.

Further, referring to FIG. 12, the foregoing primary base station further includes:

a first determining unit 1003, configured to: determine a first sending time point, and send the first sending time point to the foregoing sending unit 1002, where:

the first sending time point is a time point obtained by subtracting prestored first duration from the first time point, and the first duration is a time interval between a time point at which the terminal receives a second message and a default time point at which the TDD configuration information of the secondary serving cell takes effect on the terminal, where:

the foregoing sending unit 1002 is further specifically configured to: receive the first sending time point sent by the foregoing first determining unit 1003, and when the first sending time point arrives, send the second message to the terminal, where the second message includes the TDD configuration information of the secondary serving cell and the identity of the secondary serving cell.

Further, the foregoing sending unit 1002 is specifically configured to: send a first message to the secondary base station, where the first message includes a second time point, the TDD configuration information of the secondary serving cell, and the identity of the secondary serving cell, and the second time point is a time at which the TDD configuration information of the secondary serving cell takes effect separately on the secondary base station and the terminal; and send the first message to the terminal.

Further, the foregoing sending unit 1002 is specifically configured to send a first message to the terminal, where the first message includes a third time point, the TDD configuration information of the secondary serving cell, and the identity of the secondary serving cell, and the third time point is a time at which the TDD configuration information of the secondary serving cell takes effect separately on the secondary base station and the terminal.

Figure 13:
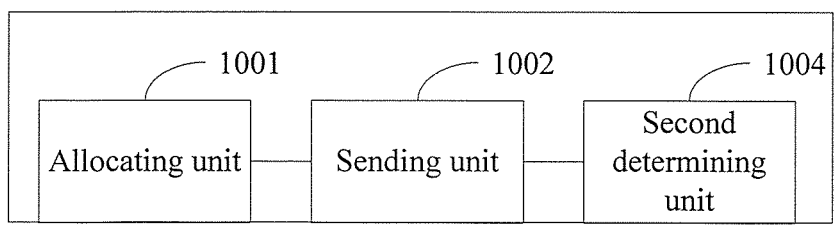
FIG. 13 is a structural diagram of a third primary base station according to Embodiment 9 of the present invention.

Further, referring to FIG. 13, the foregoing primary base station further includes:

a second determining unit 1004, configured to: determine a second sending time point, and send the second sending time point to the foregoing sending unit 1002, where:

the second sending time point is a time point obtained by subtracting prestored second duration from the third time point, and the second duration is a time interval between a time point at which the secondary base station receives a second message and a default time point at which the TDD configuration information of the secondary serving cell takes effect on the secondary base station, where the foregoing sending unit 1002 is further specifically configured to: receive the second sending time point sent by the foregoing second determining unit 1004, and when the second sending time point arrives, send the second message to the secondary base station, where the second message includes the TDD configuration information of the secondary serving cell and the identity of the secondary serving cell.

Figure 14:
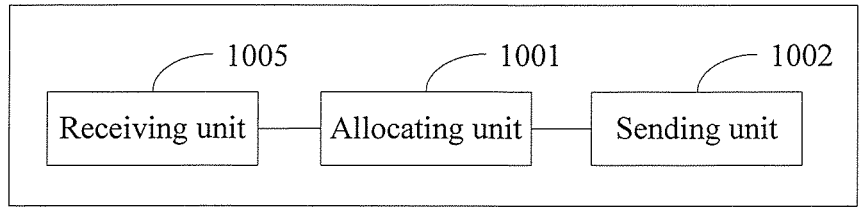
FIG. 14 is a structural diagram of a fourth primary base station according to Embodiment 9 of the present invention.

Further, referring to FIG. 14, the foregoing primary base station further includes:

a receiving unit 1005, configured to: receive a request message sent by the secondary base station, where the request message includes a data volume in a downlink buffer of the secondary serving cell and a data volume in an uplink buffer of the terminal; and send the request message to the foregoing allocating unit 1001, where:

the foregoing allocating unit 1001 is specifically configured to: receive the request message sent by the foregoing receiving unit 1005, and determine the TDD configuration information for the secondary serving cell of the secondary base station according to the volume of data in the downlink buffer of the secondary serving cell and the volume of data in the uplink buffer of the terminal.

According to a primary base station provided in this embodiment, according to this embodiment, when TDD configuration is performed on a secondary serving cell, the primary base station can proactively determine TDD configuration information for the secondary serving cell which requires TDD configuration, and separately send the TDD configuration information of the secondary serving cell and an identity of the secondary serving cell to a secondary base station and a terminal, so that the secondary base station and the terminal can determine an uplink-downlink subframe allocation of the secondary serving cell according to the TDD configuration information of the secondary serving cell. In this embodiment, after both the secondary base station and the terminal receive the TDD configuration information of the secondary serving cell and the identity of the secondary serving cell that are sent by the primary base station, and determine the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect, it is ensured that the TDD configuration information of the secondary serving cell takes effect on a secondary base station and on the terminal simultaneously.

Embodiment 10

Figure 15:
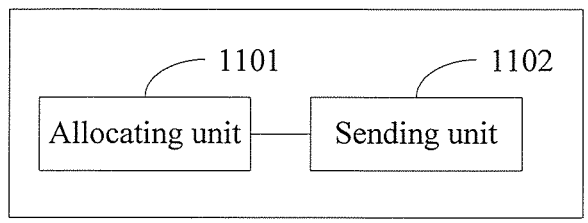
FIG. 15 is a structural diagram of a secondary base station according to Embodiment 10 of the present invention.

Referring to FIG. 15, FIG. 15 is a structural diagram of a secondary base station 1100 according to this embodiment, and the secondary base station 1100 includes:

an allocating unit 1101, configured to: determine time division duplex TDD configuration information for a secondary serving cell of the secondary base station, and send the TDD configuration information of the secondary serving cell to a sending unit 1102; and the sending unit 1102, configured to: receive the TDD configuration information of the secondary serving cell that is sent by the foregoing allocating unit 1101, and send the TDD configuration information of the secondary serving cell and an identity of the secondary serving cell to a primary base station, so that the primary base station sends the TDD configuration information of the secondary serving cell and the identity of the secondary serving cell to a terminal, and therefore the terminal determines an uplink-downlink subframe allocation of the secondary serving cell according to the TDD configuration information of the secondary serving cell.

Further, the sending unit 1102 is specifically configured to: receive the TDD configuration information of the secondary serving cell that is sent by the allocating unit 1101, and send a first message to the primary base station, where the first message includes a first time point, the TDD configuration information of the secondary serving cell, and the identity of the secondary serving cell, and the first time point is used to indicate a time at which the primary base station sends a second message to the terminal, so that when the first time point arrives, the primary base station sends the second message to the terminal, where the second message includes the TDD configuration information of the secondary serving cell and the identity of the secondary serving cell.

Further, the sending unit 1102 is specifically configured to: receive the TDD configuration information of the secondary serving cell that is sent by the allocating unit 1101, and send a first message to the primary base station, where the first message includes a second time point, the TDD configuration information of the secondary serving cell, and the identity of the secondary serving cell, and the second time point is a time at which the TDD configuration information of the secondary serving cell takes effect separately on the secondary base station and the terminal, so that the primary base station sends the first message to the terminal.

According to a secondary base station provided in this embodiment, according to this embodiment, when TDD configuration is performed on a secondary serving cell, the secondary base station can proactively determine TDD configuration information for the secondary serving cell, which requires TDD configuration, of the secondary base station, and send the TDD configuration information of the secondary serving cell and an identity of the secondary serving cell to a primary base station; therefore, after receiving the TDD configuration information of the secondary serving cell and the identity of the secondary serving cell that are sent by the secondary base station, the primary base station can send the TDD configuration information of the secondary serving cell and the identity of the secondary serving cell to a terminal, so that the terminal can determine an uplink-downlink subframe allocation of the secondary serving cell according to the TDD configuration information of the secondary serving cell. In this embodiment, after the terminal receives the TDD configuration information of the secondary serving cell and the identity of the secondary serving cell that are sent by the primary base station, and determines the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect, it is ensured that the TDD configuration information of the secondary serving cell takes effect on a secondary base station and on the terminal simultaneously.

Embodiment 11

Figure 16:
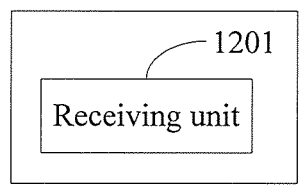
FIG. 16 is a structural diagram of a secondary base station according to Embodiment 11 of the present invention.

Referring to FIG. 16, FIG. 16 is a structural diagram of a secondary base station 1200 according to this embodiment, and the secondary base station 1200 includes:

a receiving unit 1201, configured to receive time division duplex TDD configuration information of a secondary serving cell of the secondary base station and an identity of the secondary serving cell that are sent by a primary base station, so that the secondary base station determines an uplink-downlink subframe allocation of the secondary serving cell according to the TDD configuration information of the secondary serving cell.

Further, the foregoing receiving unit 1201 is further configured to: receive buffer status report information of a terminal that is sent by the terminal, and send the buffer status report information to a determining unit 1202.

Further, the receiving unit 1201 is specifically configured to receive a first message sent by the primary base station, where the first message includes a first time point, the TDD configuration information of the secondary serving cell, and the identity of the secondary serving cell, and a first time point is a default time at which the TDD configuration information of the secondary serving cell takes effect on the secondary base station.

Figure 17:
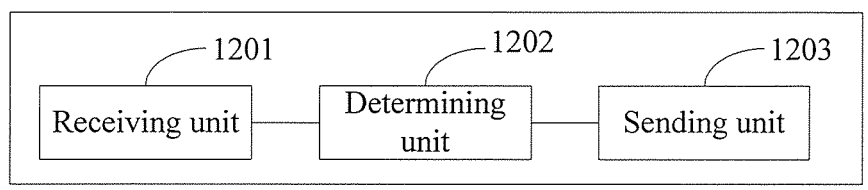
FIG. 17 is a structural diagram of another secondary base station according to Embodiment 11 of the present invention.

Further, referring to FIG. 17, the foregoing secondary base station further includes:

the determining unit 1202, configured to: receive the buffer status report information sent by the foregoing receiving unit 1201, determine the volume of data in an uplink buffer of the terminal according to the buffer status report information, and send the volume of data in the uplink buffer of the terminal to a sending unit; and the sending unit 1203, configured to: receive the volume of data, sent by the determining unit 1202, in the uplink buffer of the terminal, and send a request message to the primary base station, where the request message includes the volume of data in a downlink buffer of the secondary serving cell and the volume of data in the uplink buffer of the terminal.

According to a secondary base station provided in this embodiment, according to this embodiment, when TDD configuration is performed on a secondary serving cell, the secondary base station can receive TDD configuration information of the secondary serving cell and an identity of the secondary serving cell that are sent by a primary base station, and determine an uplink-downlink subframe allocation of the secondary serving cell according to the TDD configuration information of the secondary serving cell. In this embodiment, after both the secondary base station and a terminal receive the TDD configuration information of the secondary serving cell and the identity of the secondary serving cell that are sent by the primary base station, and determine the uplink-downlink subframe allocation of the secondary serving cell according to the TDD configuration information of the secondary serving cell, TDD configuration of the secondary serving cell is completed. It can be learned that in one aspect of this embodiment, when a primary serving cell and a secondary serving cell of a terminal belong to different base stations, TDD configuration of the secondary serving cell can be completed; in another aspect, it is ensured that the TDD configuration information of the secondary serving cell on a secondary base station synchronizes and on the terminal simultaneously.

Figure 18:
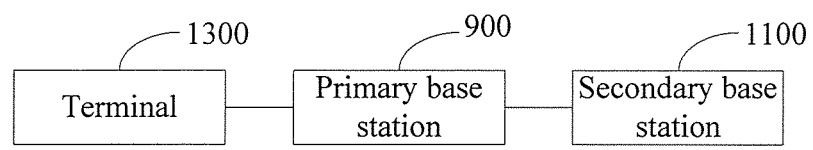
FIG. 18 is a structural diagram of a system for implementing time division duplex configuration of a secondary serving cell according to Embodiment 11 of the present invention.

Referring to FIG. 18, FIG. 18 is a structural diagram of a system for implementing time division duplex configuration of a secondary serving cell according to this embodiment, and the system includes a terminal 1300, the foregoing primary base station 900 in Embodiment 8, and the foregoing secondary base station 1100 in Embodiment 10.

Figure 19:
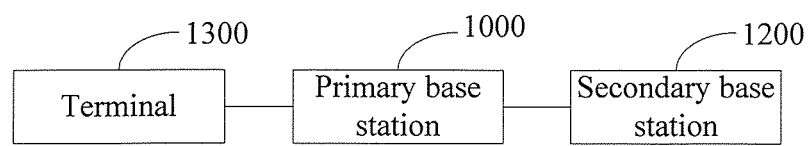
FIG. 19 is a structural diagram of another system for implementing time division duplex configuration of a secondary serving cell according to Embodiment 11 of the present invention.

Referring to FIG. 19, FIG. 19 is a structural diagram of another system for implementing time division duplex configuration of a secondary serving cell according to this embodiment, and the system includes a terminal 1300, the foregoing primary base station 1000 in Embodiment 9, and the foregoing secondary base station 1200 in Embodiment 11.

According to a system for implementing time division duplex configuration of a secondary serving cell provided in this embodiment, according to the system, when TDD configuration is performed on a secondary serving cell, a secondary base station can proactively determine TDD configuration information for the secondary serving cell, which requires TDD configuration, of the secondary base station, and send the TDD configuration information of the secondary serving cell and an identity of the secondary serving cell to a primary base station; therefore, the primary base station receives the TDD configuration information of the secondary serving cell and the identity of the secondary serving cell that are sent by the secondary base station, and can send the TDD configuration information of the secondary serving cell and the identity of the secondary serving cell to a terminal, so that the terminal determines an uplink-downlink subframe allocation of the secondary serving cell according to the TDD configuration information of the secondary serving cell. Alternatively, a primary base station proactively determines TDD configuration information for the secondary serving cell which requires TDD configuration, and separately sends the TDD configuration information of the secondary serving cell and an identity of the secondary serving cell to a secondary base station and a terminal, so that the secondary base station and the terminal can determine an uplink-downlink subframe allocation of the secondary serving cell according to the TDD configuration information of the secondary serving cell. In this embodiment, after both the secondary base station and the terminal acquire the TDD configuration information of the secondary serving cell, and determine the uplink-downlink subframe allocation of the secondary serving cell according to the TDD configuration information of the secondary serving cell, TDD configuration of the secondary serving cell is completed. It can be learned that according to this embodiment, when a primary serving cell and a secondary serving cell of a terminal belong to different base stations, TDD configuration of the secondary serving cell can be completed.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk, or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing time division duplex configuration, the method comprising:

receiving, by a primary base station, time division duplex (TDD) configuration information of a secondary serving cell and an identity of the secondary serving cell from a secondary base station, wherein the TDD configuration information of the secondary serving cell is determined by the secondary base station for the secondary serving cell, and the secondary serving cell belongs to the secondary base station; and sending, by the primary base station, the TDD configuration information of the secondary serving cell and the identity of the secondary serving cell to a terminal which maintains connections with the primary base station and the secondary base station simultaneously;

wherein before sending, by the primary base station, the TDD configuration information of the secondary serving cell and the identity of the secondary serving cell to the terminal, the method further comprises:

after receiving, by the primary base station, the TDD configuration information of the secondary serving cell and the identity of the secondary serving cell, determining a third time point that is a time point obtained by adding a prestored first duration to a time point at which the primary base station receives the TDD configuration information of the secondary serving cell and the identity of the secondary serving cell, wherein the third time point is a time at which the TDD configuration information of the secondary serving cell takes effect on the terminal, and the first duration is a time interval between a time point at which the secondary base station sends the TDD configuration information of the secondary serving cell and the identity of the secondary serving cell and a default time point at which the TDD configuration information of the secondary serving cell takes effect on the secondary base station; and wherein sending, by the primary base station, the TDD configuration information of the secondary serving cell and the identity of the secondary serving cell to the terminal comprises:
sending, by the primary base station, a second message to the terminal before the third time point arrives, wherein the second message comprises the TDD configuration information of the secondary serving cell and the identity of the secondary serving cell.

2. The method according to claim 1, wherein:
receiving, by the primary base station, the TDD configuration information of the secondary serving cell of the secondary base station and the identity of the secondary serving cell that are sent by the secondary base station comprises:
receiving, by the primary base station, a first message sent by the secondary base station, wherein the first message comprises a first time point, the TDD configuration information of the secondary serving cell, and the identity of the secondary serving cell, and the first time point is used to indicate a time at which the primary base station sends a second message to the terminal; and
sending, by the primary base station, the TDD configuration information of the secondary serving cell and the identity of the secondary serving cell to the terminal comprises:
sending, by the primary base station, the second message to the terminal at the first time point, wherein the second message comprises the TDD configuration information of the secondary serving cell and the identity of the secondary serving cell.

3. The method according to claim 1, wherein:
receiving, by the primary base station, the TDD configuration information of the secondary serving cell and the identity of the secondary serving cell that are sent by the secondary base station comprises:
receiving, by the primary base station, a first message sent by the secondary base station, wherein the first message comprises a second time point, the TDD configuration information of the secondary serving cell of the secondary base station, and the identity of the secondary serving cell, and the second time point is a time at which the TDD configuration information of the secondary serving cell takes effect separately on the secondary base station and the terminal; and
sending, by the primary base station, the TDD configuration information of the secondary serving cell and the identity of the secondary serving cell to the terminal comprises:
sending, by the primary base station, the first message to the terminal before the second time point arrives.

4. A method for implementing time division duplex configuration, the method comprising:
determining, by a secondary base station, time division duplex (TDD) configuration information for a secondary serving cell of the secondary base station, wherein the secondary serving cell belongs to the secondary base station; and
sending, by the secondary base station, the TDD configuration information of the secondary serving cell and an identity of the secondary serving cell to a primary base station, so that the primary base station sends the TDD configuration information of the secondary serving cell and the identity of the secondary serving cell to a terminal which maintains connections with the primary base station and the secondary base station simultaneously;
wherein before sending, by the primary base station, the TDD configuration information of the secondary serving cell and the identity of the secondary serving cell to the terminal, the method further comprises:
after receiving, by the primary base station, the TDD configuration information of the secondary serving cell and the identity of the secondary serving cell, determining a third time point that is a time point obtained by adding a prestored first duration to a time point at which the primary base station receives the TDD configuration information of the secondary serving cell and the identity of the secondary serving cell, wherein the third time point is a time at which the TDD configuration information of the secondary serving cell takes effect on the terminal, and the first duration is a time interval between a time point at which the secondary base station sends the TDD configuration information of the secondary serving cell and the identity of the secondary serving cell and a default time point at which the TDD configuration information of the secondary serving cell takes effect on the secondary base station; and
wherein sending, by the primary base station, the TDD configuration information of the secondary serving cell and the identity of the secondary serving cell to the terminal comprises:
sending, by the primary base station, a second message to the terminal before the third time point arrives, wherein the second message comprises the TDD configuration information of the secondary serving cell and the identity of the secondary serving cell.

5. The method according to claim 4, wherein sending, by the secondary base station, the TDD configuration information of the secondary serving cell and the identity of the secondary serving cell to the primary base station comprises:
sending, by the secondary base station, a first message to the primary base station, wherein the first message comprises a first time point, the TDD configuration information of the secondary serving cell, and the identity of the secondary serving cell, and the first time point is used to indicate a time at which the primary base station sends a second message to the terminal, so that when the first time point arrives, the primary base station sends the second message to the terminal, wherein the second message comprises the TDD configuration information of the secondary serving cell and the identity of the secondary serving cell.

6. The method according to claim 4, wherein sending, by the secondary base station, the TDD configuration information of the secondary serving cell and the identity of the secondary serving cell to the primary base station comprises:
sending, by the secondary base station, a first message to the primary base station, wherein the first message comprises a second time point, the TDD configuration information of the secondary serving cell, and the identity of the secondary serving cell, and the second time point is a time at which the TDD configuration information of the secondary serving cell takes effect simultaneously on the secondary base station and the terminal.

7. A primary base station, comprising:
a receiver, configured to receive time division duplex (TDD) configuration information of a secondary serving cell and an identity of the secondary serving cell from a secondary base station, wherein the TDD configuration information of the secondary serving cell is determined by the secondary base station for the secondary serving cell, and the secondary serving cell belongs to the secondary base station;
a transmitter, configured to send the TDD configuration information of the secondary serving cell and the identity of the secondary serving cell received by the receiver to a terminal which maintains connections with the primary base station and the secondary base station simultaneously; and
a processor coupled to the receiver and to the transmitter, the processor configured to:
after the receiver receives the TDD configuration information of the secondary serving cell and the identity of the secondary serving cell, determine a third time point that is a time point obtained by adding a prestored first duration to a time point at which the receiver receives the TDD configuration information of the secondary serving cell and the identity of the secondary serving cell, wherein the third time point is a time at which the TDD configuration information of the secondary serving cell takes effect on the terminal, and the first duration is a time interval between a time point at which the secondary base station sends the TDD configuration information of the secondary serving cell and the identity of the secondary serving cell and a default time point at which the TDD configuration information of the secondary serving cell takes effect on the secondary base station; and
the transmitter is configured to:
send a second message to the terminal under control of the processor, wherein the second message comprises the TDD configuration information of the secondary serving cell and the identity of the secondary serving cell.

8. The primary base station according to claim 7, wherein:
the receiver is configured to:
receive a first message from the secondary base station, wherein the first message comprises a first time point, the TDD configuration information of the secondary serving cell, and the identity of the secondary serving cell, and the first time point is used to indicate a time at which the primary base station sends a second message to the terminal; and
the transmitter is configured to:
send the second message to the terminal, wherein the second message comprises the TDD configuration information of the secondary serving cell and the identity of the secondary serving cell.

9. The primary base station according to claim 7, wherein:
the receiver is configured to:
receive a first message from the secondary base station, wherein the first message comprises a second time point, the TDD configuration information of the secondary serving cell, and the identity of the secondary serving cell, and the second time point is a time at which the TDD configuration information of the secondary serving cell takes effect simultaneously on the secondary base station and the terminal; and the transmitter is configured to:
send the first message to the terminal before the second time point arrives.

10. A secondary base station, comprising:
a processor, configured to determine time division duplex (TDD) configuration information for a secondary serving cell of the secondary base station, wherein the secondary serving cell belongs to the secondary base station; and
a transmitter, configured to send the TDD configuration information of the secondary serving cell and an identity of the secondary serving cell to a primary base station, so that the primary base station, after receiving the TDD configuration information of the secondary serving cell and the identity of the secondary serving cell, determines a third time point that is a time point obtained by adding a prestored first duration to a time point at which the primary base station receives the TDD configuration information of the secondary serving cell and the identity of the secondary serving cell, wherein the third time point is a time at which the TDD configuration information of the secondary serving cell takes effect on the terminal, and the first duration is a time interval between a time point at which the secondary base station sends the TDD configuration information of the secondary serving cell and the identity of the secondary serving cell and a default time point at which the TDD configuration information of the secondary serving cell takes effect on the secondary base station, and sends a second message to the terminal under control of the processor, wherein the second message comprises the TDD configuration information of the secondary serving cell and the identity of the secondary serving cell, and sends the TDD configuration information of the secondary serving cell and the identity of the secondary serving cell to a terminal which maintains connections with the primary base station and the secondary base station.

11. The secondary base station according to claim 10, wherein the transmitter is configured to:
send a first message to the primary base station, wherein the first message comprises a first time point, the TDD configuration information of the secondary serving cell, and the identity of the secondary serving cell, and the first time point is used to indicate a time at which the primary base station sends a second message to the terminal, so that when the first time point arrives, the primary base station sends the second message to the terminal, wherein the second message comprises the TDD configuration information of the secondary serving cell and the identity of the secondary serving cell.

12. The secondary base station according to claim 10, wherein the transmitter is configured to:
send a first message to the primary base station, wherein the first message comprises a second time point, the TDD configuration information of the secondary serving cell, and the identity of the secondary serving cell, and the second time point is a time at which the TDD configuration information of the secondary serving cell takes effect simultaneously on the secondary base station and the terminal.

* * * * *